US011003600B2

(12) United States Patent
Stankevichus et al.

(10) Patent No.: US 11,003,600 B2
(45) Date of Patent: May 11, 2021

(54) METHOD AND SYSTEM FOR SCHEDULING I/O OPERATIONS FOR PROCESSING

(71) Applicant: YANDEX EUROPE AG, Lucerne (CH)

(72) Inventors: Aleksey Alekseevich Stankevichus, Moscow (RU); Sergey Vladimirovich Trifonov, Moskovskaya obl (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/560,409

(22) Filed: Sep. 4, 2019

(65) Prior Publication Data

US 2020/0201792 A1    Jun. 25, 2020

(30) Foreign Application Priority Data

Dec. 21, 2018  (RU) .......................... RU2018145551

(51) Int. Cl.
*G06F 13/16*       (2006.01)
*G06F 3/06*        (2006.01)
*G06F 9/48*        (2006.01)

(52) U.S. Cl.
CPC ........ *G06F 13/1668* (2013.01); *G06F 3/0611* (2013.01); *G06F 9/4887* (2013.01)

(58) Field of Classification Search
CPC ... G06F 13/1668; G06F 3/0611; G06F 9/4887
See application file for complete search history.

(56) References Cited

U.S. PATENT DOCUMENTS

| 5,247,677 | A | 9/1993 | Welland et al. |
| 5,278,984 | A | 1/1994 | Batchelor |
| 5,577,202 | A | 11/1996 | Padgett |
| 5,640,563 | A | 6/1997 | Carmon |
| 5,845,316 | A | 12/1998 | Hillyer et al. |
| 6,023,720 | A | 2/2000 | Aref et al. |

(Continued)

FOREIGN PATENT DOCUMENTS

| CN | 105653365 A | 6/2016 |
| CN | 103514037 B | 6/2018 |

(Continued)

OTHER PUBLICATIONS

Russian Search Report dated Nov. 8, 2019 issued in respect of the Russian Patent Application No. RU2018132711.

(Continued)

*Primary Examiner* — Eric T Oberly
(74) *Attorney, Agent, or Firm* — BCF LLP

(57) ABSTRACT

An operations scheduler and a method of scheduling I/O operations to be processed by a memory drive are disclosed. The method includes receiving I/O operations, and for each one of them determining an estimated processing time, and an estimated processing period indicative of an estimated deadline. The method also includes determining a scheduled order of I/O operations based on the respective estimated deadlines. The method also includes monitoring an actual processing time for the I/O operations and adjusting a virtual time of the operations scheduler if a given actual processing time is above a given estimated processing time of a given I/O operation.

20 Claims, 9 Drawing Sheets

(56) References Cited

U.S. PATENT DOCUMENTS

| | | |
|---|---|---|
| 6,256,755 B1 | 7/2001 | Hook et al. |
| 6,553,472 B2 | 4/2003 | Yang et al. |
| 6,757,897 B1 | 6/2004 | Shi et al. |
| 6,791,992 B1 | 9/2004 | Yun et al. |
| 6,851,115 B1 | 2/2005 | Cheyer et al. |
| 6,859,931 B1 | 2/2005 | Cheyer et al. |
| 7,073,021 B2 | 7/2006 | Iren et al. |
| 7,177,866 B2 | 2/2007 | Holenstein et al. |
| 7,474,989 B1 | 1/2009 | Wilcoxon |
| 7,562,362 B1 | 7/2009 | Paquette et al. |
| 7,971,093 B1 | 6/2011 | Goel et al. |
| 8,037,024 B1 | 10/2011 | Bozkaya et al. |
| 8,117,621 B2 | 2/2012 | Singh et al. |
| 8,145,838 B1 | 3/2012 | Miller et al. |
| 8,254,172 B1 | 8/2012 | Kan |
| 8,595,302 B2 | 11/2013 | Krishnamurthi et al. |
| 8,799,913 B2 | 8/2014 | Yoo et al. |
| 8,826,301 B2 | 9/2014 | Kim et al. |
| 8,838,539 B1 | 9/2014 | Ashcraft et al. |
| 8,850,018 B2 | 9/2014 | Massa et al. |
| 8,850,446 B2 | 9/2014 | Avni et al. |
| 8,930,954 B2 | 1/2015 | Hildrum et al. |
| 8,966,490 B2 | 2/2015 | Avni et al. |
| 9,037,826 B1 | 5/2015 | Brooker et al. |
| 9,047,331 B2 | 6/2015 | Rao et al. |
| 9,093,160 B1 | 7/2015 | Ellis et al. |
| 9,203,900 B2 | 12/2015 | Rao et al. |
| 9,251,195 B2 | 2/2016 | Yamada |
| 9,304,694 B2 | 4/2016 | Colgrove et al. |
| 9,348,592 B2 | 5/2016 | Jha |
| 9,354,813 B1 | 5/2016 | Dolan et al. |
| 9,400,682 B2 | 7/2016 | Persikov et al. |
| 9,477,521 B2 | 10/2016 | Truong et al. |
| 9,489,443 B1 | 11/2016 | Muniswamy-Reddy et al. |
| 9,547,528 B1 | 1/2017 | McClure et al. |
| 9,569,339 B1 | 2/2017 | Villalobos et al. |
| 9,639,396 B2 | 5/2017 | Pho et al. |
| 9,699,017 B1 | 7/2017 | Gupta et al. |
| 9,811,391 B1 | 11/2017 | Barrett |
| 9,921,557 B2 | 3/2018 | Slupik et al. |
| 10,552,215 B1 * | 2/2020 | Xu .................... G06F 9/526 |
| 10,572,323 B1 | 2/2020 | Zhai et al. |
| 2002/0099756 A1 | 7/2002 | Catthoor et al. |
| 2003/0115410 A1 | 6/2003 | Shriver |
| 2004/0213387 A1 | 10/2004 | Chandrasekaran |
| 2005/0047425 A1 | 3/2005 | Liu et al. |
| 2007/0002750 A1 | 1/2007 | Sang et al. |
| 2007/0226332 A1 * | 9/2007 | Becker-Szendy ....... G06F 16/10 709/224 |
| 2007/0268516 A1 | 11/2007 | Bugwadia et al. |
| 2007/0282660 A1 | 12/2007 | Forth et al. |
| 2008/0049633 A1 | 2/2008 | Edwards et al. |
| 2008/0168452 A1 * | 7/2008 | Molaro ............... G06F 11/1435 718/103 |
| 2008/0320482 A1 | 12/2008 | Dawson et al. |
| 2009/0013154 A1 | 1/2009 | Du et al. |
| 2009/0292744 A1 | 11/2009 | Matsumura |
| 2009/0300449 A1 | 12/2009 | Qian et al. |
| 2010/0011182 A1 | 1/2010 | Le Moal et al. |
| 2010/0035581 A1 | 2/2010 | Park et al. |
| 2010/0185847 A1 | 7/2010 | Shasha et al. |
| 2011/0145830 A1 | 6/2011 | Yamaguchi |
| 2011/0153566 A1 | 6/2011 | Larson et al. |
| 2011/0196834 A1 | 8/2011 | Kesselman et al. |
| 2011/0219100 A1 | 9/2011 | Dhuse et al. |
| 2011/0261698 A1 | 10/2011 | Kamerkar et al. |
| 2011/0314070 A1 | 12/2011 | Brown et al. |
| 2012/0046807 A1 | 2/2012 | Ruther et al. |
| 2012/0047317 A1 | 2/2012 | Yoon et al. |
| 2012/0066449 A1 | 3/2012 | Colgrove et al. |
| 2012/0124273 A1 | 5/2012 | Goss et al. |
| 2012/0204265 A1 | 8/2012 | Judge |
| 2012/0278801 A1 | 11/2012 | Nelson et al. |
| 2013/0042156 A1 | 2/2013 | Srinivasan et al. |
| 2013/0132057 A1 | 5/2013 | Deng et al. |
| 2013/0191836 A1 | 7/2013 | Meyer |
| 2013/0326161 A1 | 12/2013 | Cohen et al. |
| 2014/0019987 A1 | 1/2014 | Verma et al. |
| 2014/0074623 A1 | 3/2014 | Mohammadi et al. |
| 2014/0157276 A1 | 6/2014 | Smithson et al. |
| 2014/0208327 A1 | 7/2014 | Cadambi et al. |
| 2014/0226565 A1 | 8/2014 | Velev et al. |
| 2014/0250438 A1 | 9/2014 | Shin et al. |
| 2014/0282572 A1 | 9/2014 | Kang |
| 2014/0304601 A1 | 10/2014 | Rossano et al. |
| 2015/0127625 A1 | 5/2015 | Bulkowski et al. |
| 2015/0128149 A1 | 5/2015 | Meijer et al. |
| 2015/0237157 A1 | 8/2015 | Wang et al. |
| 2015/0347185 A1 | 12/2015 | Holt et al. |
| 2015/0347211 A1 | 12/2015 | Dang et al. |
| 2015/0347554 A1 | 12/2015 | Vasantham et al. |
| 2016/0149964 A1 | 5/2016 | Pastro |
| 2016/0188376 A1 | 6/2016 | Rosas et al. |
| 2016/0266934 A1 | 9/2016 | Rimoni |
| 2016/0291885 A1 | 10/2016 | Pendharkar et al. |
| 2017/0017676 A1 | 1/2017 | Levy et al. |
| 2017/0031713 A1 | 2/2017 | Campbell et al. |
| 2017/0048021 A1 | 2/2017 | Yanovsky et al. |
| 2017/0109203 A1 | 4/2017 | Liu et al. |
| 2017/0147488 A1 | 5/2017 | Vaquero |
| 2017/0177697 A1 | 6/2017 | Lee et al. |
| 2017/0308403 A1 | 10/2017 | Turull et al. |
| 2017/0374516 A1 | 12/2017 | Huo et al. |
| 2018/0006999 A1 | 1/2018 | Doukhvalov et al. |
| 2018/0041477 A1 | 2/2018 | Shaposhnik |
| 2018/0052710 A1 | 2/2018 | Choi et al. |
| 2018/0101448 A1 | 4/2018 | Ventura et al. |
| 2018/0114290 A1 | 4/2018 | Paltashev et al. |
| 2018/0157543 A1 | 6/2018 | Bellomo et al. |
| 2018/0260125 A1 | 9/2018 | Botes et al. |
| 2018/0293123 A1 | 10/2018 | Kondapalli et al. |
| 2018/0300385 A1 | 10/2018 | Merriman et al. |
| 2019/0163546 A1 | 5/2019 | Ungar et al. |
| 2019/0171763 A1 | 6/2019 | Cai Le et al. |
| 2020/0252761 A1 | 8/2020 | Podluzhny |

FOREIGN PATENT DOCUMENTS

| | | |
|---|---|---|
| EA | 031078 B1 | 11/2018 |
| EP | 2110990 A1 | 10/2009 |
| EP | 1508850 A3 | 3/2015 |
| GB | 2351375 A | 12/2000 |
| RU | 2273105 C2 | 3/2006 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |
| RU | 2581551 C2 | 4/2016 |
| RU | 2628146 C2 | 8/2017 |
| RU | 2649788 C1 | 4/2018 |
| RU | 2665212 C2 | 8/2018 |
| RU | 2670573 C2 | 10/2018 |
| WO | 2012065018 A2 | 5/2012 |
| WO | 2016197716 A1 | 12/2016 |

OTHER PUBLICATIONS

Russian Search Report dated Nov. 26, 2019 issued in respect of the Russian Patent Application No. RU2018144176.
Russian Search Report dated Nov. 26, 2019 issued in respect of the Russian Patent Application No. RU2018132714.
Russian Search Report dated Nov. 25, 2019 issued in respect of the Russian Patent Application No. RU2018135452.
Russian Search Report dated Feb. 25, 2020 issued in respect of the Russian Patent Application No. RU2018147497.
Russian Search Report dated Feb. 25, 2010 issued in respect of the Russian Patent Application No. RU2018135460.
Russian Search Report dated Oct. 30, 2019 issued in respect of the Russian Patent Application No. RU2018136221.
Ex Parte Quale Action dated Apr. 23, 2020 received in respect of a related U.S. Appl. No. 16/383,976.

(56) References Cited

OTHER PUBLICATIONS

Grefen et al. "Two-Layer Transaction Management for Workflow Management Applications", Database and Expert Systems Applications, pp. 430-439, publication date: Sep 1997430-439.
"Deadline scheduler", retrieved on Wikipedia on Jan. 21, 2019.
"Shortest seek first", retrieved on Wikipedia on Jan. 21, 2019.
"Elevator algorithm", retrieved on Wikipedia on Jan. 21, 2019.
Abeni et al, "Constant Bandwidth Server Revisited", EWiLi'14, Nov. 2014, Lisbon, Portugal.
Virtuozzo Storage 2.3, Installation Guide, Dec. 14, 2017, retrieved from https://docs.virtuozzo.com/virtuozzo_storage_2_installation_guide/planning-virtuozzo-storage-infrastructure/understanding-data-redundancy.html.
Office Action dated Oct. 23, 2020 received in respect of a related U.S. Appl. No. 16/504,040.
Notice of Allowance dated Oct. 15, 2020 received in respect of a related U.S. Appl. No. 16/433,186.
Kumar et al, "Optimized Particle Swarm Optimization Based Deadline Constrained Task Scheduling in Hybrid Cloud", ICTACT Journal of Soft Computing, Jan. 2016, vol. 06, Issue 02, pp. 1117-1122 (Year: 2016).
Shin et al, "Deadline-Guaranteed Scheduling Algorithm with Improved Resource Utilization for Cloud Computing", 12th Annual IEEE Consumer Communications and Networking Conference (CCNC), 2015, pp. 814-819 (Year: 2015).
Chopra et al, "Deadline and Cost based Workflow Scheduling in Hybrid Cloud", 2013, IEEE, pp. 840-846 (Year: 2013).
Yuan et al, "Deadline divison-based heuristic for cost optimization in workflow scheduling". Information Sciences 179 (2009) 2562-2575, Elsevier, pp. 2562-2575 (Year: 2009).
Srinivasan et al, "Deadline-based scheduling of periodic task systems on multiprocessors", Information Processing Letters 84 (2002), 93-98, Elsevier, pp. 93-98 (Year: 2002).
Ruemmier "An Introduction to Disk Drive Modeling", Hewlett Packard Laboratories, IEEE, Mar. 1994, pp. 17-29 (Year 1994).
IEEE 100, The Authoritative Dictionary of IEEE Standards Terms, Seventh Edition, IEEE Press, 2000, pp. 245, 1184 (Year: 2000).
Office Action dated Nov. 12, 2020 received in respect of a related U.S. Appl. No. 16/367,537.
Office Action dated Nov. 20, 2020 received in respect of a related U.S. Appl. No. 16/776,011.
Russian Search Report dated Jan. 18, 2021 issued in respect to the Russian Patent Application No. RU2019103253.
Office Action dated Dec. 4, 2020 received in respect of a related U.S. Appl. No. 16/401,688.
Office Action dated Jan. 1, 2021 received in respect of a related U.S. Appl. No. 16/384,301.
Office Action dated Mar. 10, 2021 received in respect of a related U.S. Appl. No. 16/367,537.
Notice of Allowance dated Mar. 23, 2021 received in respect of a related U.S. Appl. No. 16/574,277.

\* cited by examiner

METHOD AND SYSTEM FOR SCHEDULING I/O OPERATIONS FOR PROCESSING

CROSS-REFERENCE

The present application claims priority from Russian Patent Application No. 2018145551, entitled "Method and System for Scheduling I/O Operations for Processing", filed Dec. 21, 2018, the entirety of which is incorporated herein by reference.

FIELD

The present technology relates to distributed data processing and, specifically, to a method and system for scheduling I/O operations for processing.

BACKGROUND

Storage requirements for storing digital data are continuously increasing due to the large volume of digital data that is being created everyday. For example, various types of user data, organization data and/or application data may need to be stored. This increases the demand for data storage capacity. Cloud storage systems may provide data storage capacity to users and/or organizations in order to cope with these increasing storage capacity requirements.

Generally speaking, cloud storage is a model of computer storage in which the digital data is stored in logical pools. The physical storage, where the digital data is actually stored, spans multiple servers, possibly located in different locations (i.e. different data centers), and is typically managed by a company hosting cloud storage services. Users and/or organizations usually buy or lease storage capacity from cloud storage service providers in order to store their digital data. In return, cloud storage service providers are responsible for keeping the digital data available and accessible while ensuring that the physical storage is protected for avoiding data loss.

SUMMARY

Developers of the present technology have appreciated certain technical drawbacks associated with prior art solutions for keeping data available, accessible and for avoiding data loss.

In a first broad aspect of the present technology, there is provided a method of scheduling a plurality of input/output (I/O) operations to be processed by a memory drive. The memory drive being part of a distributed computer system that has a plurality of I/O sources. The plurality of I/O sources has a first I/O source and a second I/O source. The plurality of I/O sources originates the plurality of I/O operations. Each of the first I/O source and the second I/O source are associated with a respective pre-determined proportion of processing bandwidth of the memory drive for processing I/O operations from each one of the first I/O source and the second I/O source. The distributed computer system also has an operations scheduler implementing a scheduling algorithm for scheduling the plurality of I/O operations for transmission to the memory drive. The method is executable by the operations scheduler. The method comprises receiving (i) at least one I/O operation originated by the first I/O source and (ii) at least one I/O operation originated by the second I/O source. The method comprises determining, based on memory drive characteristics, an estimated processing time for (i) the at least one I/O operation originated by the first I/O source and (ii) the at least one I/O operation originated by the second I/O source. The method comprises determining an estimated processing period for each of (i) the at least one I/O operation originated by the first I/O source and (ii) the at least one I/O operation originated by the second I/O source by using (i) the respective estimated processing time and (ii) the respective pre-determined proportion of processing bandwidth of the memory drive. A respective estimated processing period is indicative of an estimated processing deadline, and where the estimated processing deadlines are expressed in a virtual time of the operations scheduler. The method comprises executing the scheduling algorithm to determine a scheduled order of I/O operations based on the respective estimated processing deadlines of (i) the at least one I/O operation originated by the first I/O source and (ii) the at least one I/O operation originated by the second I/O source. The method comprises monitoring by the operations scheduler an actual processing time for the processing of (i) the at least one I/O operation originated by the first I/O source and (ii) the at least one I/O operation originated by the second I/O source. The actual processing time is a actual time taken by the memory drive to process (i) the at least one I/O operation originated by the first I/O source and (ii) the at least one I/O operation originated by the second I/O source. The method comprises, in response to the actual processing time being above the estimated processing time for any one of (i) the at least one I/O operation originated by the first I/O source and (ii) the at least one I/O operation originated by the second I/O source, adjusting the virtual time of the operations scheduler.

In some embodiments of the method, the adjusting the virtual time comprises, when determining an estimated processing period for an other I/O operation, adding an amount of time to the estimated processing period for the other I/O operation thereby determining an adjusted estimated processing period for the other I/O operation. The amount of time is a difference between the actual processing time and the estimated processing time for (i) the at least one I/O operation originated by the first I/O source and (ii) the at least one I/O operation originated by the second I/O source.

In some embodiments of the method, the adjusted estimated processing period for the other I/O operation is indicative of an adjusted estimated processing deadline for the other I/O operation.

In some embodiments of the method, the monitoring by the operations scheduler the actual processing time for (i) the at least one I/O operation originated by the first I/O source and (ii) the at least one I/O operation originated by the second I/O source comprises receiving, from the memory drive, processing confirmations indicative of the actual processing time for (i) the at least one I/O operation originated by the first I/O source and (ii) the at least one I/O operation originated by the second I/O source.

In some embodiments of the method, the scheduling algorithm is a real-time type scheduling algorithm.

In some embodiments of the method, wherein the real-time type scheduling algorithm is an EDF-type scheduling algorithm.

In some embodiments of the method, the determining the estimated processing period for each of (i) the at least one I/O operation originated by the first I/O source and (ii) the at least one I/O operation originated by the second I/O source comprises determining a ratio between the respective estimated processing time and the respective pre-determined proportion of processing bandwidth of the memory drive.

In some embodiments of the method, the estimated processing period for a given one of (i) the at least one I/O operation originated by the first I/O source and (ii) the at least one I/O operation originated by the second I/O source is determined such that the given one of (i) the at least one I/O operation originated by the first I/O source and (ii) the at least one I/O operation originated by the second I/O source is non-suspendably processable within the estimated processing period while respecting the respective pre-determined proportion of processing bandwidth of the memory drive.

In some embodiments of the method, the given I/O operation is a non-suspendable I/O operation.

In some embodiments of the method, the determining the estimated processing time for each one of (i) the at least one I/O operation originated by the first I/O source and (ii) the at least one I/O operation originated by the second I/O source is performed by a prediction model emulating operation of the memory drive based on the memory drive characteristics.

In a second broad aspect of the present technology, there is provided an operations scheduler for scheduling a plurality of input/output (I/O) operations to be processed by a memory drive. The memory drive is part of a distributed computer system that has a plurality of I/O sources. The plurality of I/O sources has a first I/O source and a second I/O source. The plurality of I/O sources originates the plurality of I/O operations. Each of the first I/O source and the second I/O source is associated with a respective pre-determined proportion of processing bandwidth of the memory drive for processing I/O operations from each one of the first I/O source and the second I/O source. The distributed computer system also has the operations scheduler implementing a scheduling algorithm for scheduling the plurality of I/O operations for transmission to the memory drive. The operations scheduler is configured to receive (i) at least one I/O operation originated by the first I/O source and (ii) at least one I/O operation originated by the second I/O source. The operations scheduler is configured to determine, based on memory drive characteristics, an estimated processing time for (i) the at least one I/O operation originated by the first I/O source and (ii) the at least one I/O operation originated by the second I/O source. The operations scheduler is configured to determine an estimated processing period for each of (i) the at least one I/O operation originated by the first I/O source and (ii) the at least one I/O operation originated by the second I/O source by using (i) the respective estimated processing time and (ii) the respective pre-determined proportion of processing bandwidth of the memory drive. A respective estimated processing period being indicative of an estimated processing deadline, the estimated processing deadlines expressed in a virtual time of the operations scheduler. The operations scheduler is configured to execute the scheduling algorithm to determine a scheduled order of I/O operations based on the respective estimated processing deadlines of (i) the at least one I/O operation originated by the first I/O source and (ii) the at least one I/O operation originated by the second I/O source. The operations scheduler is configured to monitor by the operations scheduler an actual processing time for the processing of (i) the at least one I/O operation originated by the first I/O source and (ii) the at least one I/O operation originated by the second I/O source. The actual processing time is an actual time taken by the memory drive to process (i) the at least one I/O operation originated by the first I/O source and (ii) the at least one I/O operation originated by the second I/O source. The operations scheduler is configured to, in response to the actual processing time being above the estimated processing time for any one of (i) the at least one I/O operation originated by the first I/O source and (ii) the at least one I/O operation originated by the second I/O source, adjust the virtual time of the operations scheduler.

In some embodiments of the operations scheduler, the operations scheduler configured to adjust the virtual time comprises the operations scheduler being configured to, when determining an estimated processing period for an other I/O operation, add an amount of time to the estimated processing period for the other I/O operation thereby determining an adjusted estimated processing period for the other I/O operation. The amount of time is a difference between the actual processing time and the estimated processing time for (i) the at least one I/O operation originated by the first I/O source and (ii) the at least one I/O operation originated by the second I/O source.

In some embodiments of the operations scheduler, the adjusted estimated processing period for the other I/O operation is indicative of an adjusted estimated processing deadline for the other I/O operation.

In some embodiments of the operations scheduler, the operations scheduler configured to monitor the actual processing time for (i) the at least one I/O operation originated by the first I/O source and (ii) the at least one I/O operation originated by the second I/O source comprises the operations scheduler being configured to receive, from the memory drive, processing confirmations indicative of the actual processing time for (i) the at least one I/O operation originated by the first I/O source and (ii) the at least one I/O operation originated by the second I/O source.

In some embodiments of the operations scheduler, the scheduling algorithm is a real-time type scheduling algorithm.

In some embodiments of the operations scheduler, the real-time type scheduling algorithm is an EDF-type scheduling algorithm.

In some embodiments of the operations scheduler, the operations scheduler configured to determine the estimated processing period for each of (i) the at least one I/O operation originated by the first I/O source and (ii) the at least one I/O operation originated by the second I/O source comprises the operations scheduler being configured to determine a ratio between the respective estimated processing time and the respective pre-determined proportion of processing bandwidth of the memory drive.

In some embodiments of the operations scheduler, the estimated processing period for a given one of (i) the at least one I/O operation originated by the first I/O source and (ii) the at least one I/O operation originated by the second I/O source is determined such that the given one of (i) the at least one I/O operation originated by the first I/O source and (ii) the at least one I/O operation originated by the second I/O source is non-suspendably processable within the estimated processing period while respecting the respective pre-determined proportion of processing bandwidth of the memory drive.

In some embodiments of the operations scheduler, the given I/O operation is a non-suspendable I/O operation.

In some embodiments of the operations scheduler, the operations scheduler is configured to determine the estimated processing time for each one of (i) the at least one I/O operation originated by the first I/O source and (ii) the at least one I/O operation originated by the second I/O source by using a prediction model emulating operation of the memory drive based on the memory drive characteristics.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
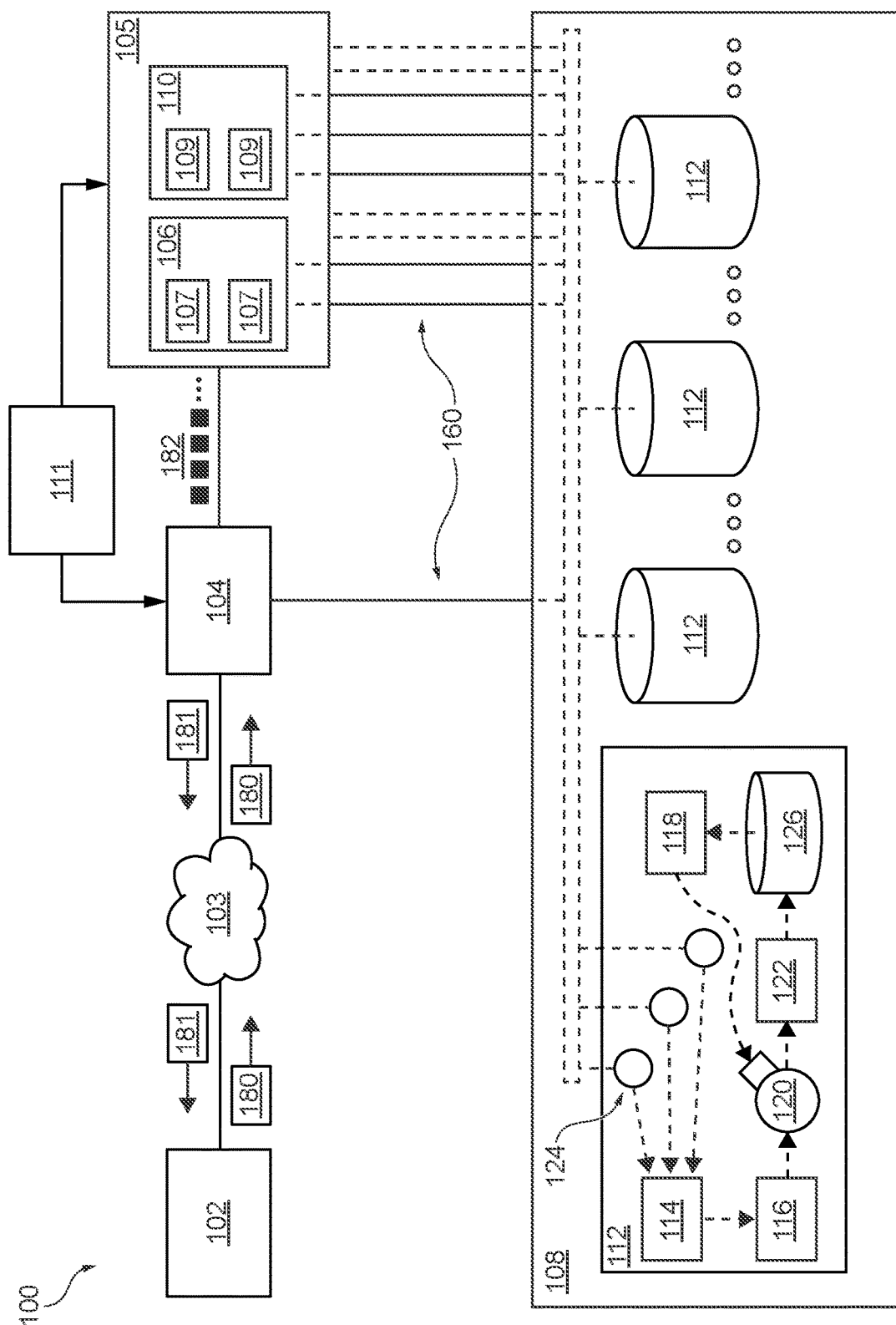
FIG. 1 depicts a system suitable for implementing non-limiting embodiments of the present technology.

Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100, however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational Sub-System (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data" i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 116, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Re-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transaction 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support ACID transactions. Broadly speaking, ACID (atomicity, consistency, isolation and durability) is an acronym for a set of transaction properties which are directed to maintain database reliability when transactions are executed. Therefore, in some embodiments of the present technology, it is contemplated that transactions destined to the transaction processing sub-system 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective transaction destination locations TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
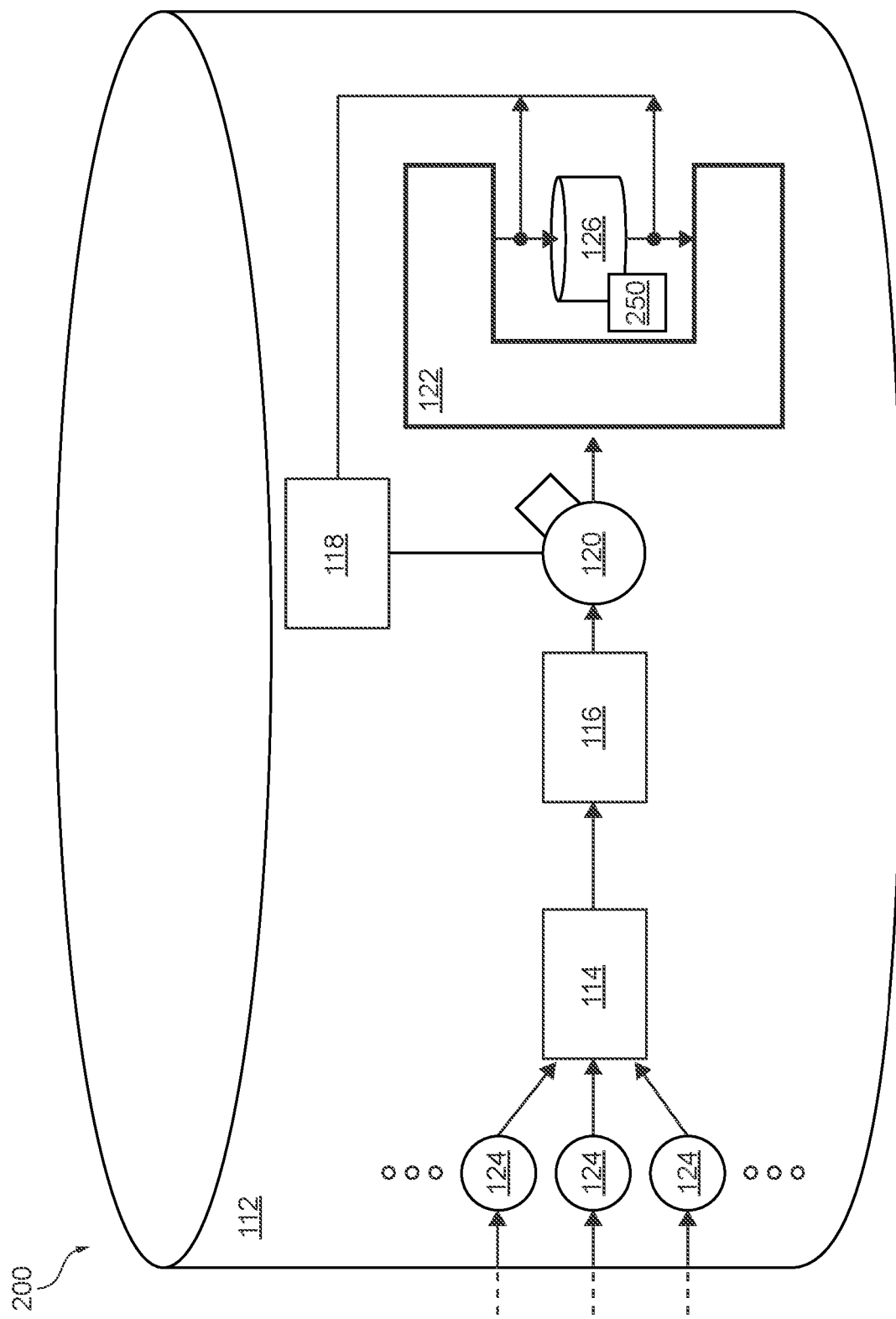
FIG. 2 depicts a storage device of a distributed storage sub-system of FIG. 1 in accordance with some embodiments of the present technology.

In FIG. 2, there is depicted the storage device 112 which is part of the distributed storage sub-system 108. As previously mentioned, the storage device 112 comprises the at least one SM proxy 124. The purpose of a given SM proxy is to manage communication between a given SM and the distributed storage sub-system 108. In some embodiments of the present technology, it is contemplated that the at least one SM proxy 124 of the storage device 112 may be an Application Programming Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding I/O operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, the operation scheduling application 120 may be implemented as part of the Pdrive application 116. In other words, execution of various scheduling schemes may be performed by the Pdrive application 116, without departing from the scope of the present technology.

The operation scheduling application 120 provides a scheduling scheme of a "fair" type. It should be understood that a given storage device 112 may require to store I/O operations corresponding to system data associated with more than one SMs. Also, each one of the more than one SMs is associated with a pre-determined proportion of drive bandwidth that the memory drive 126 may allocate for processing the I/O operations associated with that respective SM. Therefore, broadly speaking, fair-type scheduling schemes are configured to order the I/O operations to be transmitted to the memory drive 126 such that the drive bandwidth of the memory drive 126 for processing the ordered I/O operations is used in accordance with the pre-determined proportions associated with the more than one SMs.

Also, the operation scheduling application 120 provides a scheduling scheme of a "real-time" type. It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the processing of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be processed by the memory drive 126 within respectively associated deadlines.

As previously mentioned, the memory drive 126 is a storage medium for processing I/O operations and thereby storing system data transmitted to the storage device 112. For example, the memory drive 126 may be implemented as an HDD or an SSD. The memory drive 126 includes a drive-internal logic 250 for selecting a given I/O operation for current processing amongst all I/O operations transmitted thereto.

It should be noted that I/O operations may potentially be sent one-by-one for processing to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for processing.

For example, the most efficient I/O operation may be selected based on a variety of criteria such as, for example, a location where a previous I/O operation has been processed on the memory drive 126 and locations of the I/O operations available to the memory drive 126 where they are ought to be processed on the memory drive 126. In other words, the drive-internal logic 250 is configured to select, for current processing, a most efficient one (from the perspective of the memory drive 126) amongst all the I/O operations available to the memory drive 126 at a given moment in time.

For that reason, in some cases, although the operation scheduling application 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by the operation scheduling application 120. Therefore, it may happen that the execution order may no longer respect the real-time requirements of the distributed processing system 100 (especially as additional I/O operations are received from the operation scheduling application 120, which additional I/O operations may be more "efficient" from the perspective of the memory drive 126 and that may be picked over non-yet-executed I/O operations).

In order to ensure real-time operation of the storage device 112 and to avoid the above-described problem (which is also known as "operation stagnation"), the storage device 112 may include the real-time operation enforcing application 122. Broadly speaking, the real-time operation enforcing application 122 allows controlling which I/O operations amongst those that have been already ordered by the operation scheduling application 120 are transmitted at any given time to the memory drive 126 for processing.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. In other embodiments, however, the operation scheduling application 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Multi-Source Systems

Broadly speaking, a given multi-source system is a given system having a given task-processing entity and a multitude of sources. The given multi-source system is designed such that sources provide "tasks" to the given task-processing entity, which is then configured to process the tasks received from the more than one sources.

Some multi-source systems may need to concurrently process tasks received from different sources. To that end, a given multi-source system may also comprise a given scheduler that is configured to provide a scheduling order in which tasks received from different sources of the given multi-source system are arranged for processing by the task-processing entity.

Figure 3:
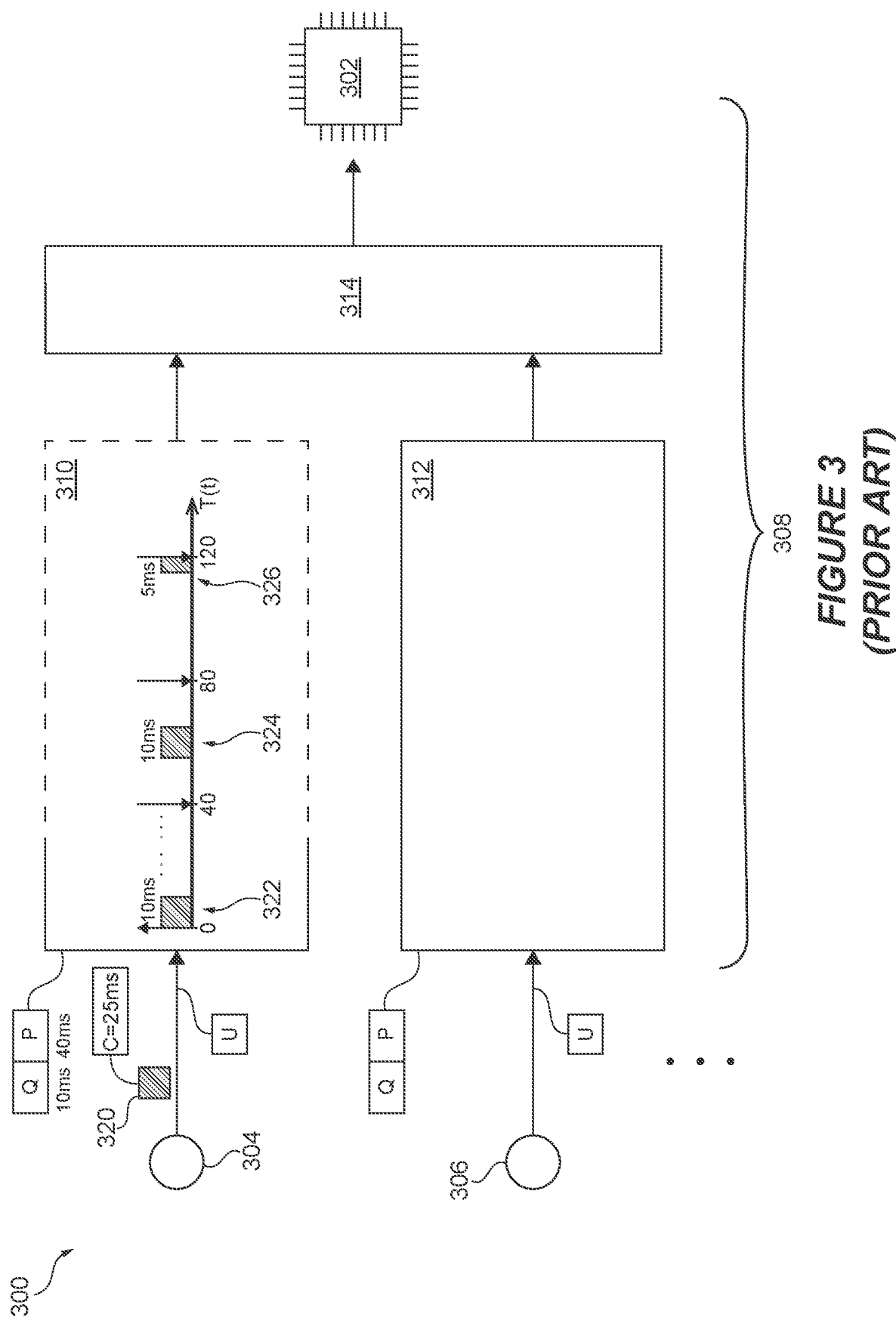
FIG. 3 depicts a conventional multi-source system for a Central Processing Unit (CPU) in accordance with prior art technologies.

With reference to FIG. 3, there is depicted a conventional multi-source system 300 where the task-processing entity is embodied as a Central Processing Unit (CPU) 302 and where the more than one sources are embodied as applications 304 and 306. For example, the conventional multi-source system 300 may be implemented within a given electronic device (not depicted) comprising the CPU 302 and where the given electronic device is configured to execute the applications 304 and 306. Hence, the applications 304 and 306 provide tasks to the CPU 302 for processing.

For the CPU 302 to concurrently process tasks from both the applications 304 and 306, the conventional multi-source system 300 includes a scheduling architecture 308. The scheduling architecture 308 includes conventional Constant Bandwidth Server (CBS) algorithms 310 and 312 and an Earliest Deadline First (EDF) scheduler 314. How a conventional CBS algorithm is configured, how a given EDF scheduler is configured, and how the scheduling architecture 308 provides a scheduling order for tasks received from the applications 304 and 306 to be processed by the CPU 302 will be described below.

However, prior to describing the CBS algorithms 310 and 312 and the EDF scheduler 314, it should be noted that each one of the applications 304 and 306 is associated with a respective pre-determined proportion "U" of processing bandwidth of the CPU 302 that is allocated for processing tasks of the respective application. For example, let it be assumed that the application 304 is allocated 25% of the processing bandwidth (U=¼) of the CPU 302 for processing tasks of the application 304. This means that up to a quarter of all processing bandwidth of the CPU 302 may be used to process tasks of the application 304.

Pre-determining a proportion U for a given source in a given multi-source system is typically done for splitting the processing bandwidth of a given task-processing entity amongst the more than one sources so that tasks from the more than one sources can be processed concurrently.

It should also be noted that the scheduling architecture 308 comprises a respective CBS algorithm for each one of the applications 304 and 306. In other words, tasks of the application 304 are received by the CBS algorithm 310, while tasks of the application 306 are received by the CBS algorithm 312.

Generally speaking, the CBS algorithms 310 and 312 are used to ensure that the processing bandwidth of the CPU 302 is "fairly" used for processing tasks received from each one of the applications 304 and 306. In other words, a given CBS algorithm is configured to ensure that tasks received from a respective application are processed by the CPU 302 in accordance with the pre-determined proportion "U" of the respective application. For example, the CBS algorithm 310 is configured to ensure that tasks received from the application 304 are processed by the CPU 302 by using the respectively allocated 25% of the processing bandwidth of the CPU 302.

To that end, a given CBS algorithm is configured to operate based on two parameters, namely a budget "Q" (in milliseconds, for example) and a period "P" (in milliseconds, for example)—that is, a given CBS algorithm (such as, for example, the given one of the CBS algorithms 310 and 312) is configured to budget Q amount of processing time of the CPU 302 at every time period P for processing tasks of a respective application. The two parameters Q and P are pre-determined for each CBS algorithm (such as, for example, the given one of the CBS algorithms 310 and 312) based on the pre-determined proportion U of processing bandwidth of the CPU 302 allocated for processing tasks of the respective application. For example, the two parameters Q and P of a given CBS algorithm may be pre-determined in accordance with the following equation:

$$U_i = \frac{Q_i}{P_i} \tag{1}$$

For example, in the case of the CBS algorithm 310, the parameter Q may be pre-determined to be 10 ms while the parameter P may be pre-determined to be 40 ms. This means that, in order to ensure that tasks of the application 304 are allocated 25% (U=¼) of processing bandwidth of the CPU 302, the CBS algorithm 310 is configured to budget up to 10 ms of processing time of the CPU 302 at every time period of 40 ms for processing tasks of the application 304.

Generally speaking, the EDF scheduler 314 is a real-time type scheduler that is used to support real-time requirements of the conventional multi-source system 300. The purpose of a real-time type scheduler, such as the EDF scheduler 314, is to order tasks for transmission to a task-processing entity, such as the CPU 302, based on the respective deadlines so as to ensure that the tasks are processed before the respective deadlines. In the specific case of the EDF scheduler 314, the EDF scheduler 314 orders the tasks received thereby such that the task with the earliest deadline is transmitted before other tasks to the CPU 302 for processing thereof.

Two different scenarios of how a given task of the application 304 may be scheduled for processing by the CPU 302 will be described below.

However, prior to describing the two scenarios, it should be noted that tasks received from a given application to be processed by the CPU 302 are associated with an actual amount of time (or cost "C") that is required for processing a respective task. For example, if a given task is associated with a cost C of 5 ms, this means that 5 ms will be required for processing the given task by the CPU 302.

In a first scenario (not illustrated), let it be assumed that the CBS algorithm 310 receives a given task from the application 304, the given task being associated with a cost C of 5 ms. The CBS algorithm 310 may determine that the cost C of the given task is below the respective budget Q of 10 ms for a period P of time of 40 ms. As such, the CBS algorithm 310 may determine that the given task should be executed (as a whole) within 40 ms from a moment in time at which the given task has been received, since the cost C of 5 ms for the given task is below 10 ms of processing time that is budgeted for processing tasks from the application 304 within the next period of 40 ms.

As a result, in this first scenario, the CBS algorithm 310 may determine a given deadline for the given task by which the given task should be executed by the CPU 302. In this first scenario, the given deadline is 40 ms from the moment in time at which the given task has been received.

The CBS algorithm 310 is then configured to transmit the given task and the respective determined deadline to the EDF scheduler 314. The EDF scheduler 314 receives the given task, and potentially other tasks with respective deadlines from other CBS algorithms such as the CBS algorithm 312, for example, and schedules them for transmission for processing as explained above.

In a second scenario (illustrated in FIG. 3), let it be assumed that the CBS algorithm 310 receives a task 320 from the application 304, the task 320 being associated with a cost C of 25 ms. This means that, in some cases, such as in the case of the second scenario, a given application (a given source) may transmit tasks with costs Cs that are above the budget Q of a respective CBS algorithm.

In this second scenario, the CBS algorithm 310 may determine that, since the cost C of 25 ms is above the pre-determined budget Q of 10 ms, the task 320 should be processed in portions during sequential periods P of 40 ms so as to respect the pre-determined proportion U of ¼ for the application 304. Therefore, as depicted in FIG. 3, the CBS algorithm 310 determines that:

a first task portion 322 (of the task 320) having a cost C of 10 ms should be processed within the 40 ms (one time period P) from the moment in time that the task 320 has been received that is, the deadline for the first task portion 322;

a second task portion 324 (of the task 320) having a cost C of 10 ms should be processed within the 80 ms (two time periods P) from the moment in time that the task 320 has been received that is, the deadline for the second task portion 324; and a third task portion 326 (of the task 320) having a cost C of 5 ms should be processed within the 120 ms (three time periods P) from the moment in time that the task 320 has been received that is, the deadline for the third task portion 326.

Put another way, in the conventional multi-source system 300, when a given task has a cost C that surpasses the budget Q of a given CBS algorithm, the CBS algorithm is configured to determine respective deadlines for various task portions of the given task so as to respect the pre-determined proportion U of a respective application.

Therefore, it can be said that in the case of the conventional multi-source system 300, the CBS algorithm 310 may "split" the task 320 into three task portions since tasks that are to be processed by the CPU 302 are "suspendable" tasks. In other words, the tasks processed by the conventional multi-source systems 300 are not required to be processed as a whole. This means that the first task portion 322 of the task 320 can be processed by the CPU 302 until a first moment in time, at which the processing of the task 320 is suspended for processing another given task until a second moment in time, at which the CPU 302 resumes processing of the task 320 by processing the second task portion 324, and so on.

As a result, conventional CBS algorithms are well-suited for ensuring that the processing bandwidth of a given task-processing entity is fairly used for processing tasks received from more than one sources of a given conventional multi-source system and where the tasks to be processed are "suspendable" such that when the cost C of a given task surpasses the budget Q of a respective CBS algorithm, that given task can be split into portions with respective deadlines for processing.

In some embodiments of the present technology, multi-source systems are envisioned where the task-processing entities are embodied as memory drives. In one non-limiting example, a multi-source system as envisioned in the context of the present technology may include the memory drive 126 and more than one Vdrive application 114 as seen in FIG. 1.

As opposed to the CPU 302 that is configured to processes suspendable tasks, the memory drive 126 is configured to process I/O operations, as explained above. In most cases, I/O operations are not suspendable tasks in the sense that, most I/O operations need to be processed as a whole. In other words, in most cases, a given I/O operation cannot be split into portions that the memory drive 126 can process separately from one another.

As such, the scheduling architecture 308 comprising conventional CBS algorithms is not suitable for determining deadlines for I/O operations in a multi-source system when the task-processing entity is embodied as a given memory drive. The developers of the present technology have developed non-limiting embodiments of I/O operations schedulers that are suitable for multi-source systems where I/O operations from more than one I/O sources need to be scheduled for processing by a given memory drive.

I/O Schedulers for I/O Operations

Figure 4:
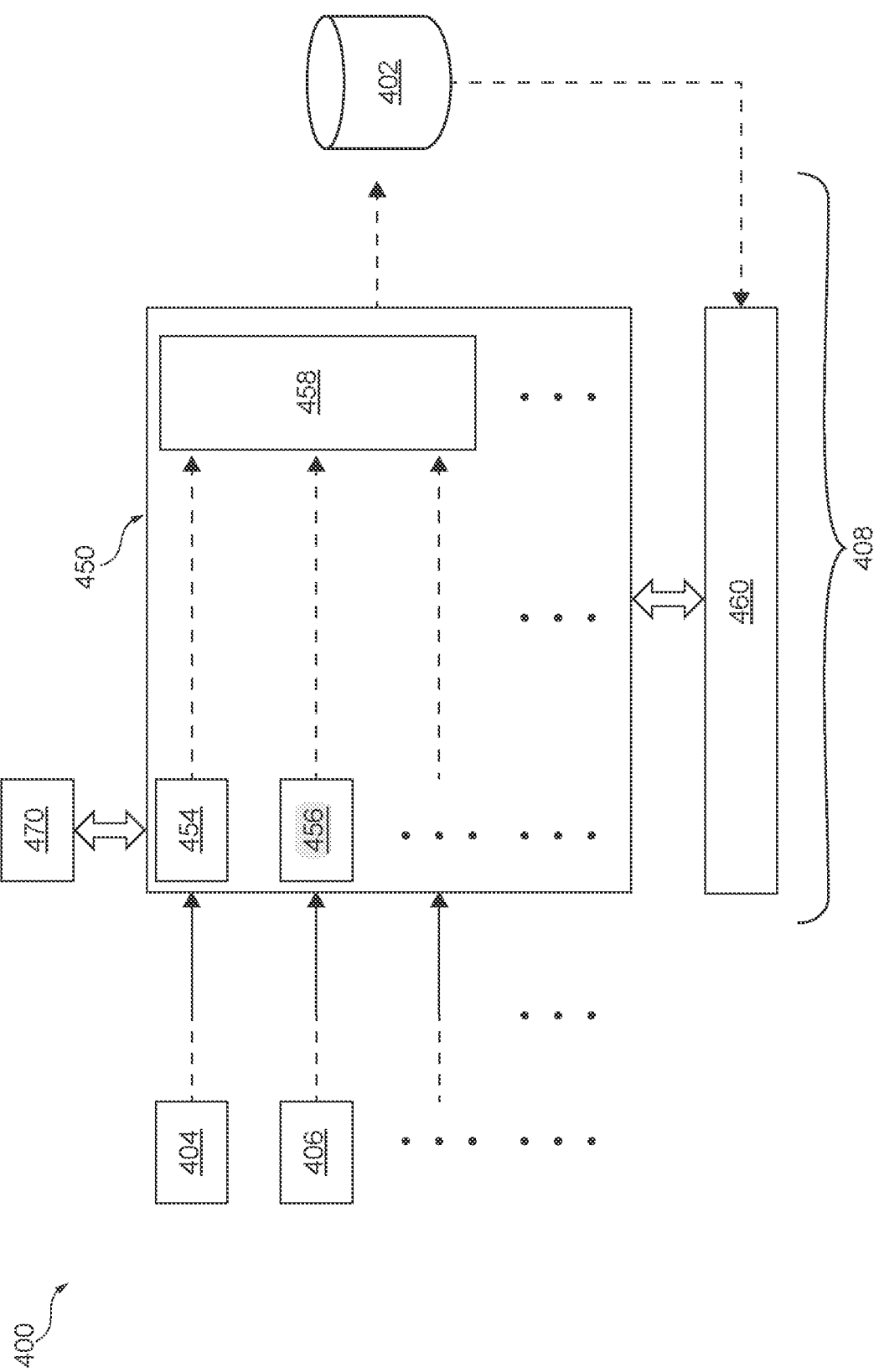
FIG. 4 depicts a multi-source system for a memory drive in accordance with some embodiments on the present technology.

With reference to FIG. 4, there is depicted a multi-source system 400 in accordance with a non-limiting example of the present technology. The multi-source system 400 comprises a first I/O source 404 and a second I/O source 406. For example, the first I/O source 404 may be implemented as a first Vdrive application 114 generating I/O operations, while the second I/O source 406 may be implemented as a second Vdrive application 114 generating I/O operations.

The multi-source system 400 also comprises a memory drive 402 and an operations scheduler 408. For example, the memory drive 402 may be implemented as the memory drive 126 of FIG. 1. The operations scheduler 408 may be implemented as the operation scheduling application 120 of FIG. 1. As explained above, the operation scheduling application 120 may be implemented by the Pdrive application 116. Therefore, naturally, the operations scheduler 408 may be implemented as part of the Pdrive application 116 without departing from the scope of the present technology.

The operations scheduler 408 comprises a drive model 470, a scheduling portion 450, and a Scheduling Adjustment Algorithm (SAA) 460. Functionality of the various components of the operations scheduler 408 will now be described.

The drive model 470 is associated with the memory drive 402. Similarly to the drive model application 118, which is configured to emulate ideal operation of the memory drive 126, the drive model 470 may be configured to emulate ideal operation of the memory drive 402. In fact, in embodiments where the memory drive 402 is implemented as the memory drive 126, the drive model 470 may be implemented as the drive model application 118, without departing from the scope of the present technology.

It is contemplated that the drive model 470 is a given prediction model having been built to emulate operation of the memory drive 402 based on memory drive characteristics of the memory drive 402.

The drive model 470 may be employed by the scheduling portion 450 for estimating parameters based on which some components of the scheduling portion 450 may be configured to determine estimated processing deadlines for respective I/O operations. Although it will be described in greater detail herein further below, it should be noted that the drive model 470 may be configured to estimate a processing time required by the memory drive 402 for processing a given I/O operation—that is, the drive model 470 may be configured to determine an estimated cost C* of a given I/O operation.

The scheduling portion 450, broadly speaking, is configured to generate/determine estimated processing deadlines for I/O operations received from the first I/O source 404 and the second I/O source 406 (and from other potential 110 sources) and to generate a scheduled order of I/O operations based on the generated estimated processing deadlines for further processing by the memory drive 402.

The scheduling portion 450 comprises a respective Deadline Generation (DG) algorithm for each I/O source of the multi-source system 400, namely a first DG algorithm 454 for the first I/O source 404 and a second DG algorithm 456 for the second I/O source 406.

Similarly to what has been described above, each I/O source is associated with a respective pre-determined proportion U of processing bandwidth of the memory drive 402. Hence, broadly speaking, the first DG algorithm 454 and the second DG algorithm 456 are used for ensuring that the processing bandwidth of the memory drive 402 is fairly shared amongst the first I/O source 404 and the second I/O source 406 (e.g., in accordance with the respective pre-determined proportions Us).

The first DG algorithm 454 is configured to generate estimated processing deadlines for I/O operations of the first I/O source 404, while ensuring that a pre-determined proportion U1 associated with the first I/O source 404 is used for processing the I/O operations of the first I/O source 404. Similarly, the second DG algorithm 456 is configured to generate estimated processing deadlines for I/O operations of the second I/O source 406, while ensuring that a pre-determined proportion U2 associated with the second I/O source 406 is used for processing the I/O operations of the second I/O source 406. To that end, it is contemplated that the first DG algorithm 454 and the second DG algorithm 456 may be configured to (i) employ the drive model 470 for estimating the costs Cs of I/O operations received thereby, and (ii) based on the estimated costs Cs* of the I/O operations, generate estimated processing deadlines for the I/O operations received thereby.

How a given DG algorithm is configured to generate estimated processing deadlines for I/O operations of a respective I/O source will be described in greater details herein further below.

It should be noted that a given DG algorithm implemented as part of the scheduling portion 450 operates in accordance with a virtual time, as opposed to operating in accordance with an actual time. In the context of present technology, virtual time is used for representing processing time intervals (or the sum thereof) that are planned for the memory drive 402.

How a given DG algorithm is configured to operate in accordance with the virtual time will be described in greater details herein further below.

The scheduling portion 450 also comprises a real-time type scheduling algorithm 458. Broadly speaking, the real-time type scheduling algorithm 458 is employed for supporting real-time requirements of the multi-source system 400. The real-time type scheduling algorithm 458 is configured to order I/O operations for transmission to the memory drive 402 such that the I/O operations may be processed by the memory drive 402 before the respectively associated estimated processing deadlines (as generated by respective DG algorithms).

Which specific real-time type scheduling algorithm the scheduling portion 450 is configured to implement is not particularly limiting. However, in one non-limiting example, the real-time type scheduling algorithm 458 may be implemented as a given EDF-type scheduling algorithm.

As it will be discussed herein further below, the I/O operations ordered by the real-time type scheduling algorithm 458 may be transmitted to the memory drive 402 in batches. For example, in some embodiments of the present technology, the operations scheduler 408 may be configured to group the ordered I/O operations into I/O batches and transmit these I/O batches to the memory drive 402 for processing.

In other embodiments, where the memory drive 402 is implemented as the memory drive 126, the grouping of the I/O operations into I/O batches may be performed by an intermediary component such as the real-time operation enforcing application 122, for example. For instance, the operations scheduler 408 may be configured to transmit the ordered I/O operations to the real-time operation enforcing application 122 which then groups them into I/O batches and transmits the I/O batches to the memory drive 402 for processing.

As mentioned above, the operations scheduler 408 also comprises the SAA 460. Generally speaking, the SAA 460 is configured to "adjust" the virtual time based on which DG algorithms operate. Recalling that DG algorithms generate estimated processing deadlines for I/O operations based on respective estimated costs Cs* provided by the drive model 470, the generated estimated processing deadlines in the virtual time may be misaligned with the actual time since the estimated costs Cs* based on which they have been generated may not correspond to the actual costs Cs of the I/O operations.

Therefore, it is contemplated that the SAA 460 may be configured to receive from the memory drive 402 data indicative of an actual processing time (actual costs Cs) that has been required for processing I/O operations in any given I/O batch. The SAA 460 may also be configured to compare the actual costs Cs of I/O operations in the I/O batch to the estimated costs Cs* of the I/O operations in the I/O batch. As a result, the SAA 460 may then be configured to adjust the virtual time based on which the DG algorithms operate based on the comparison between the actual costs Cs of the I/O operations in the I/O batch and the estimated costs Cs* of the I/O operations in the I/O batch. The adjusted virtual time is then used for scheduling future I/O operations.

For example, the adjustment of the virtual time may allow determining, by the DG algorithms, adjusted estimated processing periods P* and adjusted estimated processed deadlines for future I/O operations.

How and when the SAA 460 is configured to adjust the virtual time based on which the DG algorithms operate will be described in greater details herein further below.

Scheduling of an I/O Operation

A non-limiting example of how a given I/O operation is scheduled by the operations scheduler 408 for processing by the memory drive 402 will now be described with reference to FIG. 5. Let it be assumed that the first I/O source 404 transmits an I/O operation 520 to the operations scheduler 408. The first DG algorithm 454 receives the I/O operation 520 and is configured to determine/generate an estimated processing deadline for the I/O operation 520.

As previously alluded to, an actual cost C1 of the I/O operation 520 is unknown when the I/O operation 520 is received by the first DG algorithm 454. The first DG algorithm 454 is configured to employ the drive model 470 (e.g., a prediction model built based on memory drive characteristics of the memory drive 402) for estimating the cost C1 of the I/O operation 520. As mentioned above, the drive model 470 is configured to emulate ideal operation of the memory drive 402 and, as a result, determines an estimated cost C1* for the I/O operation 520 based on the I/O operation 520.

Let it be assumed that the drive model 470 determines that the estimated cost C1* for the I/O operation 520 is 25 ms. In other words, the drive model 470 estimates that the memory drive 402 will require 25 ms for processing the I/O operation 520. The drive model 470 is configured to transmit the estimated cost C1* of 25 ms to the first DG algorithm 454.

As mentioned above, most I/O operations are not suspendable in the sense that the memory drive 402 needs to process the I/O operation 520 as a whole. For that reason, the DG algorithm 454 is configured to dynamically determine an estimated budget Q1* and an estimated processing period P1* for the I/O operation 520 such that (i) the I/O operation 520 is not split into portions for processing, and (ii) that the pre-determined proportion U1 of processing bandwidth of the memory drive 402 allocated to the first I/O source 404 is respected.

Therefore, the first DG algorithm 454 is first configured to determine the estimated budget Q1* so that the I/O operation 520 is not split into portions for processing. The first DG algorithm 454 may determine that the estimated budget Q1* should be at least equal to the estimated cost C1* of 25 ms for the I/O operation 520.

It should be noted that, in order to not "split" the processing of a given I/O operation (since it is not suspendable), for a given processing period P, a budget Q needs to be at least equal to a cost C of the given I/O operation. As a result, let it be assumed that the first DG algorithm determines that the estimated budget Q1* is 25 ms (equal to the estimated cost C1* of 25 ms for the I/O operation 520).

Now that the estimated budget Q1* is determined by the first DG algorithm 454, the first DG algorithm 454 is configured to determine the estimated processing period P1* for the I/O operation 520 so that the pre-determined proportion U1 of processing bandwidth of the memory drive 402 allocated to the first I/O source 404 is respected.

Assuming that U1 is ¼ (or 25% of processing bandwidth of the memory drive 402), the first DG algorithm 454 may be configured to determine the estimated processing period P1* by employing the equation (1) presented above. This means that the first DG algorithm 454 may determine that the estimated processing period P1* is 100 ms (e.g., P1*=Q1*/U1=25 ms/0.25=100 ms).

Hence, it can be said that a given DG algorithm may be configured to dynamically estimate parameters Q* and P* for a respective I/O source based on a respective estimated cost C* of an I/O operation of the respective I/O source and the respective pre-determined proportion U.

It should be noted that the estimated processing period P1* for the I/O operation 520 is determined such that the I/O operation 520 is non-suspendably processable by the memory drive 402 within the estimated processing period P1* while respecting the pre-determined proportion U1 of the processing bandwidth.

Figure 5:
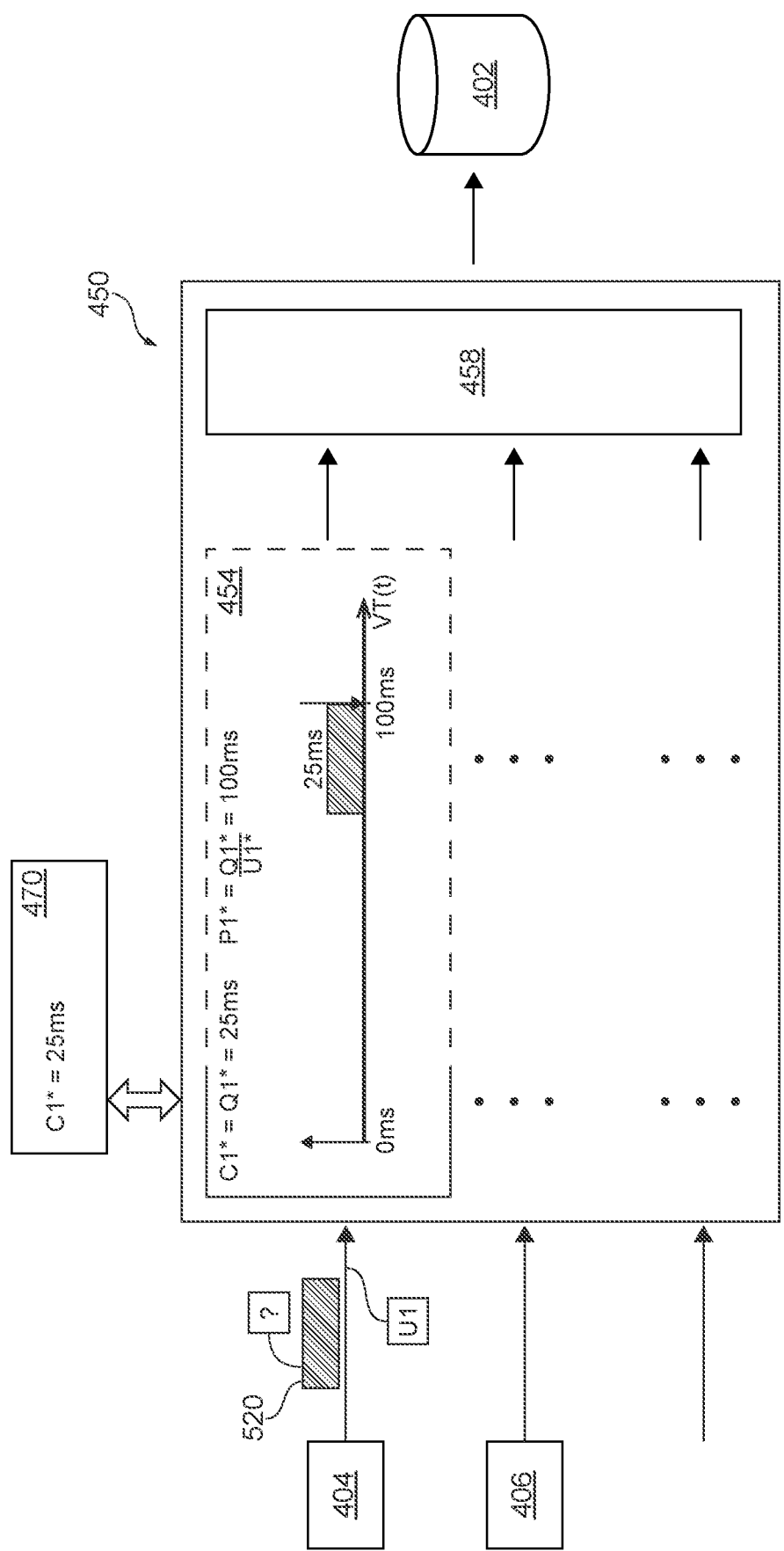
FIG. 5 depicts an estimated processing deadline generation process for an I/O operation by an operations scheduler of FIG. 4.

In the non-limiting example illustrated in FIG. 5, the first DG algorithm 454 may determine that the estimated processing deadline for the I/O operation 520 is 100 ms from the moment in time when the I/O operation 520 has been received for scheduling.

It should be noted that, although in FIG. 5 the processing of the I/O operation 520 is depicted as occurring just before the estimated processing deadline, this is done for illustration purposes only and this might not be the case in each and every non-limiting embodiment of the present technology. In fact, the goal per se is not to process the I/O operation 520 just before the estimated processing deadline, but rather to process the I/O operation such that by the time the estimated processing deadline is reached, the I/O operation 520 is processed.

It should also be noted that, as illustrated in FIG. 5, the first DG algorithm 454 operates in the virtual time (see VT(t) axis). In other words, the first DG algorithm 454 is configured to express the estimated processing deadline in the virtual time, as opposed to actual time. As such, in some instances as previously alluded to, the virtual time, in which the estimated processing deadline of the I/O operation 520 is expressed, may be adjusted by the SAA 460. As a result, a given estimated processing deadline of a given I/O operation may depend not only on the moment in time at which the given I/O operation has been received for scheduling and on the estimated processing period P*, but also may depend on the adjustment of the virtual time by the SAA 460.

However, for the sake of simplicity only, let it be assumed that at the moment in time when the estimated processing deadline for the I/O operation 520 is determined by the first DG algorithm 454, the SAA 460 has not adjusted the virtual time. How the SAA 460 is configured to adjust the virtual time and how this adjustment affects estimated processing deadlines of I/O operations received after the adjustment of the virtual time will be discussed in greater details herein further below.

Once the estimated processing deadline for the I/O operation 520 is determined as explained above, the I/O operation 520 and the respective estimated processing deadline are transmitted by the first DG algorithm 454 to the real-time type scheduling algorithm 458.

It should be noted that the second DG algorithm 456 may be configured to determine estimated processing deadlines for I/O operations of the second I/O source 406 similarly to how the first DG algorithm 454 determines the estimated processing deadline for the I/O operation 520 of the first I/O source 404.

As explained above, the real-time type scheduling algorithm 458 orders the I/O operations received from the first DG algorithm 454 and from the second DG algorithm 456 (and from other potential DG algorithms) based on the respectively associated estimated processing deadlines determined by the respective DG algorithms. The real-time type scheduling algorithm 458 may then transmit the so-ordered I/O operations for processing by the memory drive 402.

How the SAA 460 is configured to selectively adjust the virtual time will now be described with reference to both FIGS. 6 and 7.

Virtual Time Adjustment

As mentioned above, the I/O operations may be received by the memory drive 402 in I/O batches. For example, as depicted in FIG. 6, the memory drive 402 may receive an I/O batch 602 that includes four I/O operations 604, 606, 608 and 610 for processing.

The memory drive 402 is configured to process the I/O operations 604, 606, 608 and 610 from the I/O batch 602. The memory drive 402 may be configured to transmit processing confirmations indicative of that the I/O operations 604, 606, 608 and 610 have been processed (additionally or alternatively, processing confirmation may be indicative of the I/O batch 602 as a whole having been processed) to the SAA 460.

It is contemplated that the processing confirmations may be indicative of an actual processing time that has been required (that has been actually taken by the memory drive 402) for processing the I/O operations 604, 606, 608 and 610. In other words, the SAA 460 may receive indications of the actual costs Cs that have been required for processing the I/O operations 604, 606, 608 and 610.

Also, the SAA 460 may be configured to receive, from the scheduling portion 450 and/or from the drive model 470, data indicative of the estimated processing time that has been determined for the I/O operations 604, 606, 608 and 610 during scheduling. In other words, the SAA 460 may receive data indicative of the estimated costs Cs* that have been determined by the drive model 470 for the I/O operations 604, 606, 608 and 610.

The SAA 460 is configured to compare the actual costs Cs of the I/O operations 604, 606, 608 and 610 against the estimated costs Cs* of the I/O operations 604, 606, 608 and 610. Let it be assumed that a value 660 depicted in FIG. 6 is a sum of the estimated costs Cs* of the I/O operations 604, 606, 608 and 610, while a value 650 is a sum of the actual costs Cs of the I/O operations 604, 606, 608 and 610.

Figure 6:
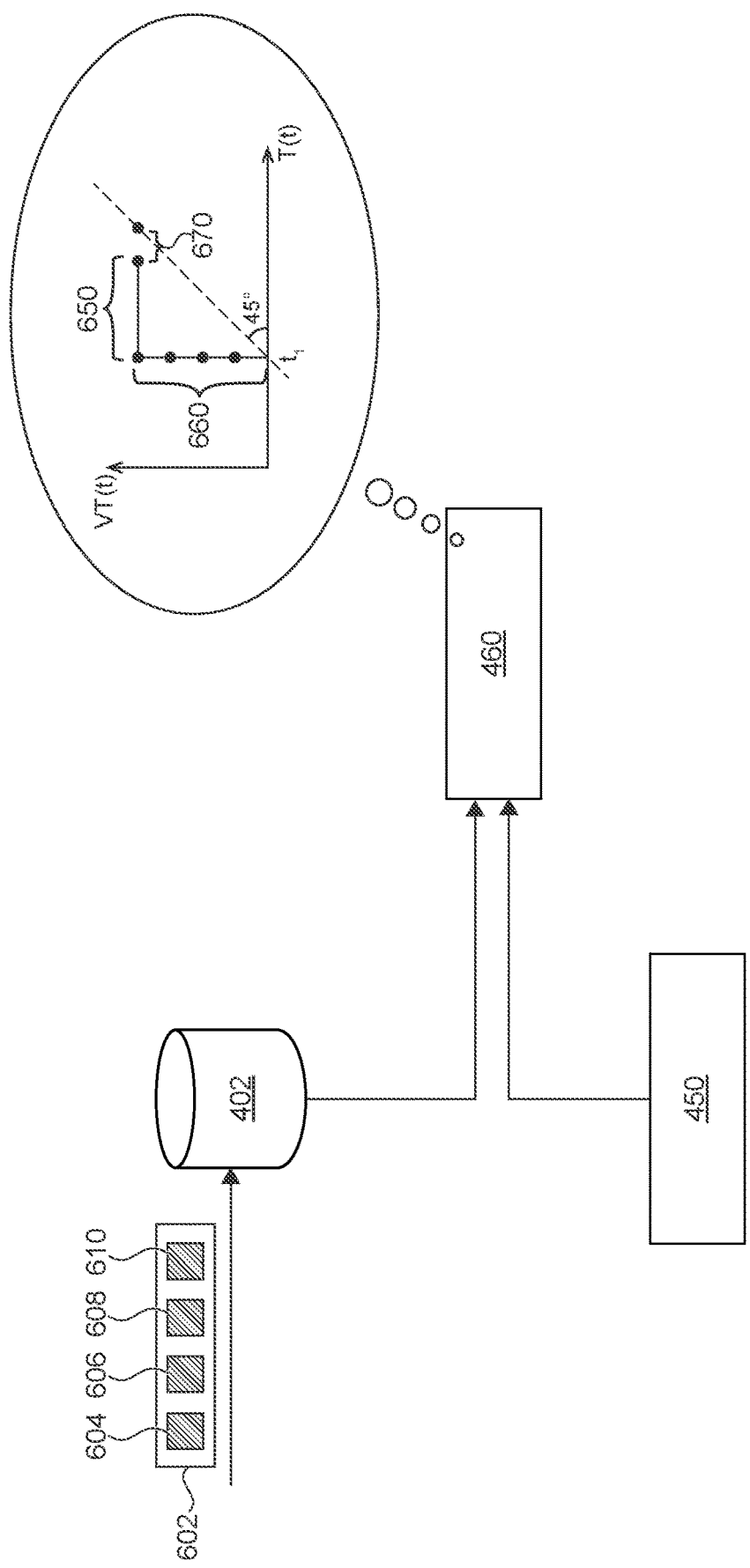
FIG. 6 depicts a first non-limiting example of how a Scheduling Adjustment Algorithm (SAA) of the operations scheduler of FIG. 4 determines whether to adjust a virtual time used by the operations scheduler.

It should be noted that a dashed line (not numbered) extending at 45 degrees is depicted in FIG. 6 solely for visually illustrating a comparison between the value 660 and the value 650. As such, it should be noted that the SAA 460 is not configured to render or generate the dashed line or a graphical representation (not numbered) of the comparison between the value 660 and the value 650.

In this case, the SAA 460 determines that the value 660 is superior to the value 650 by a value 670. This means that the memory drive 402 actually processed the I/O operations 604, 606, 608 and 610 faster than it has been estimated by the drive model 470 by an amount of time corresponding to the value 670. In this case, the SAA 460 may determine that the virtual time, based on which DG algorithms operate, is not to be adjusted.

Figure 7:
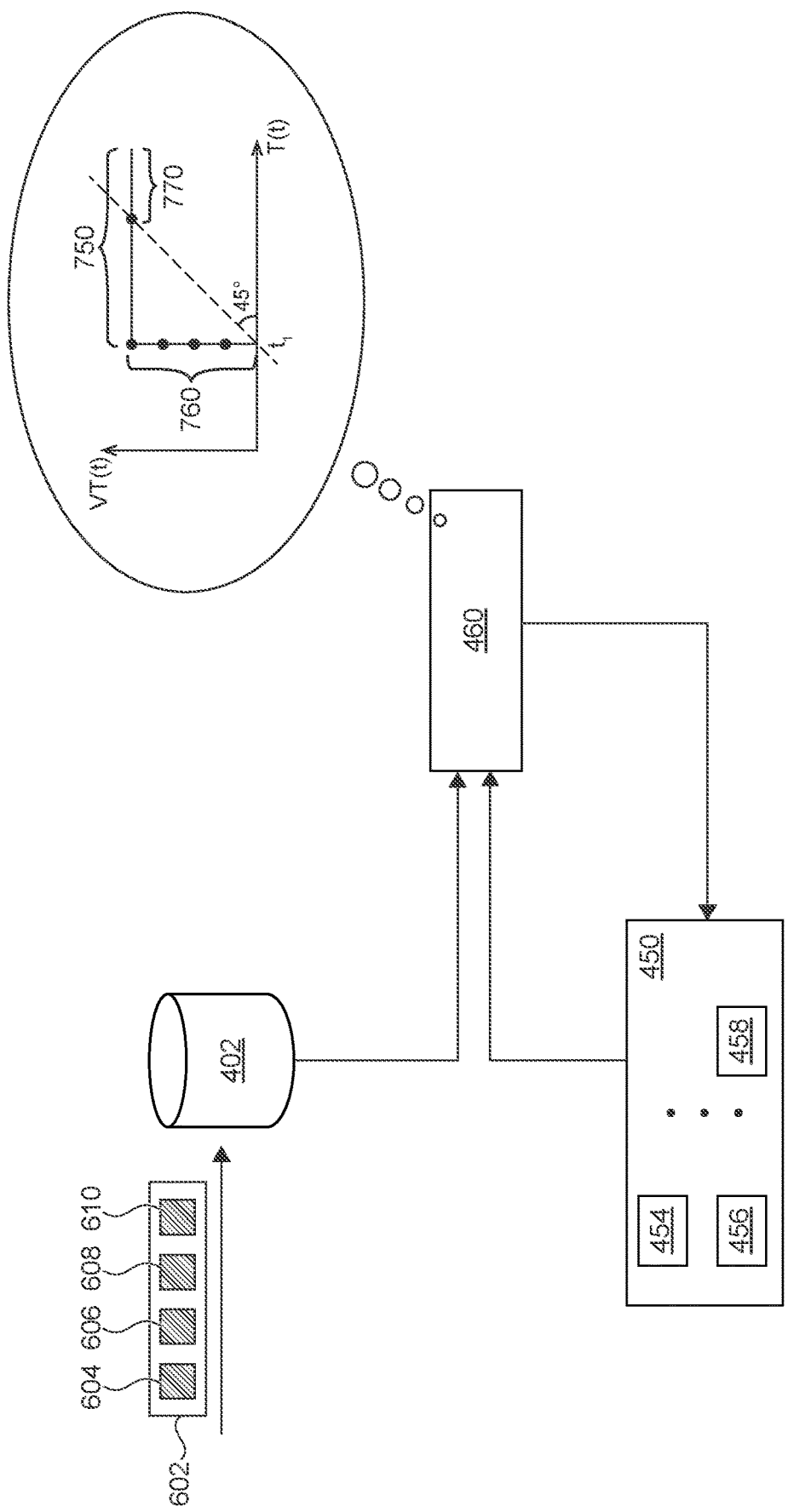
FIG. 7 depicts a second non-limiting example of how the SAA of the operations scheduler of FIG. 4 determines whether to adjust the virtual time used by the operations scheduler.

Now with reference to FIG. 7, let it be assumed that a value 760 is the sum of the estimated costs Cs* of the I/O operations 604, 606, 608 and 610, while a value 750 is the sum of the actual costs Cs of the I/O operations 604, 606, 608 and 610.

It should be noted that a dashed line (not numbered) extending at 45 degrees is depicted in FIG. 7 solely for visually illustrating a comparison between the value 760 and the value 750. As such, it should be noted that the SAA 460 is not configured to render or generate the dashed line or a graphical representation (not numbered) of the comparison between the value 760 and the value 750.

In this case, the SAA 460 determines that the value 760 is inferior to the value 750 by a value 770. This means that the memory drive 402 actually processed the I/O operations 604, 606, 608 and 610 slower than it has been estimated by the drive model 470 by an amount of time corresponding to the value 770. In this case, the SAA 460 may determine that the virtual time, based on which DG algorithms operate, is to be adjusted.

Therefore, it is contemplated that, in some embodiments of the present technology, the SAA 460 may be configured to selectively adjust the virtual time only if a sum of actual costs Cs for I/O operations is superior to a sum of estimated costs Cs* for the I/O operations.

If the sum of actual costs Cs for the I/O operations is superior to the sum of estimated costs Cs* for the I/O operations, the SAA 460 may be configured to selectively adjust the virtual time of DG algorithms by an amount of time equal to the difference between the sum of actual costs Cs and the sum of estimated costs Cs*. In the case illustrated in FIG. 7, the SAA 460 may be configured to selectively adjust the virtual time by an amount of time corresponding to the value 770.

How the selective adjustment of the virtual time by the SAA 460 affects estimated processing periods Ps* and estimated processing deadlines as determined by DG algorithms following the adjustment of the virtual time will now be described with reference to FIG. 8.

Let it be assumed that the value 770 corresponds to 15 ms. This means that the SAA 460 is configured to adjust the virtual time based on which DG algorithms operate by 15 ms.

Let it also be assumed that an I/O operation 820 is received from the first I/O source 404, similarly to how the I/O operation 520 has been received from the first I/O source 404. However, let it be assumed that the I/O operation 820 is received following the adjustment of the virtual time by the SAA 460. Therefore, it can be said that the I/O operation 820 is a given future I/O operation that is being scheduled by the operations scheduler 408 following the adjustment of the virtual time.

Similarly to how the estimated cost C1* has been determined by the drive model 470 for the I/O operation 520, the drive model 470 may determine an estimated cost C2* for the I/O operation 820. Let it be assumed that the drive model 470 determines that the estimated cost C2* is 25 ms (same as the cost C1*). Therefore, similarly to how the first DG algorithm 454 determined the estimated budget Q1* of 25 ms and the estimated processing period P1* of 100 ms for the I/O operation 520, the first DG algorithm 454 may be configured to determine an estimated budget Q2* of 25 ms and an estimated processing period P2* of 100 ms for the I/O operation 820.

However, since the virtual time has been adjusted by the moment in time when the first DG algorithm 454 is determining the estimated processing period P2* for the I/O operation 820, the first DG algorithm 454 is configured to adjust the estimated processing period P2* for the I/O operation 820 by an amount of time that is equal to an amount of time by which the virtual time has been adjusted. Put another way, in this case, the first DG algorithm 454 is configured to add the amount of time by which the virtual time has been adjusted to the estimated processing period P2* thereby determining an adjusted estimated processing period for the I/O operation 820.

In this case, the first DG algorithm is configured to add 15 ms to the estimated processing period P2* of 100 ms, thereby determining the adjusted estimated processing period of 115 ms for the I/O operation 820.

Figure 8:
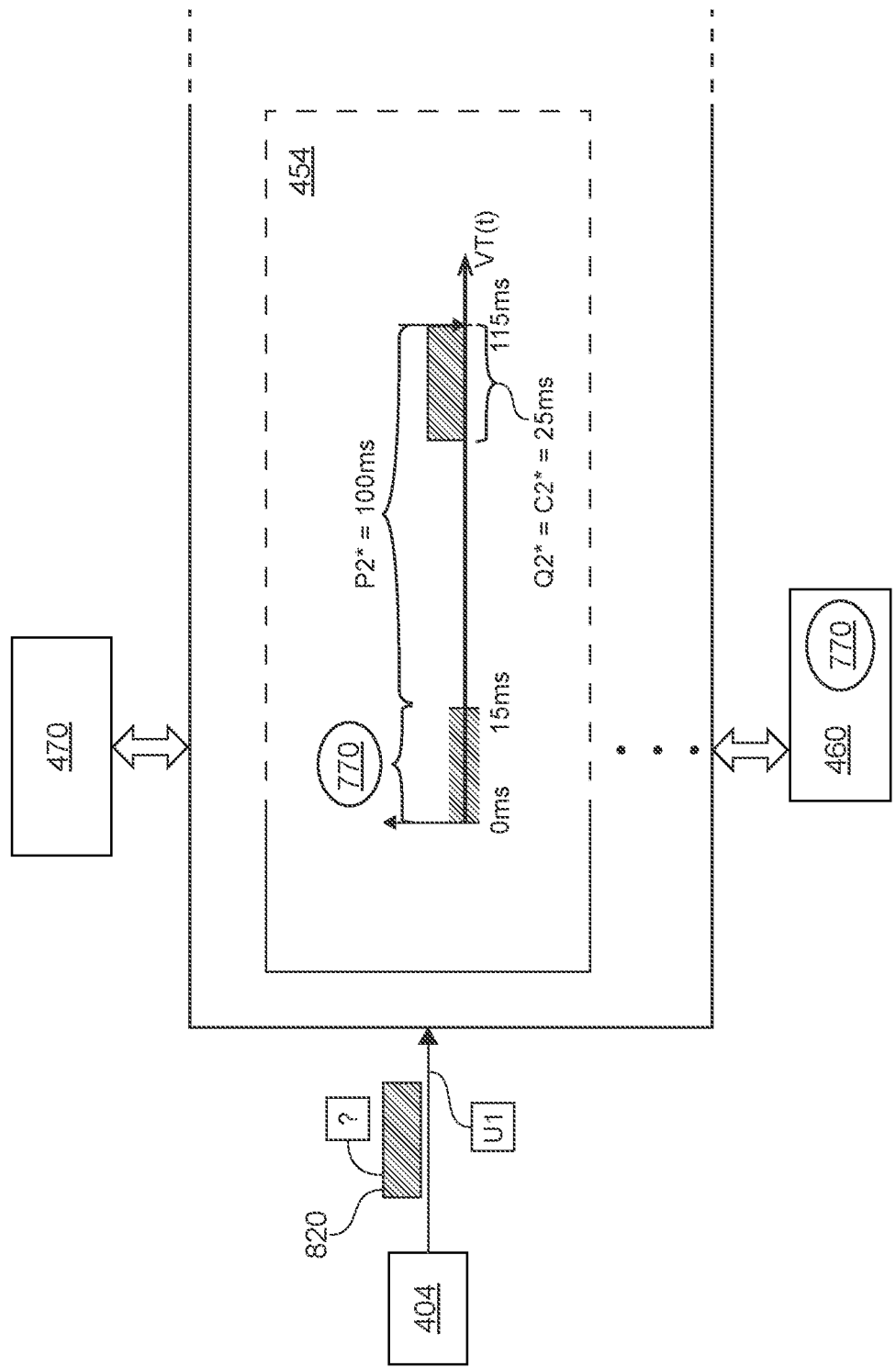
FIG. 8 depicts an adjusted estimated processing deadline generation process for an I/O operation by a operations scheduler of FIG. 4 when the virtual time is adjusted.

As illustrated in FIG. 8, the first DG algorithm 454 is configured to generate an adjusted estimated processing deadline for the I/O operation 820 as 115 ms (P2* of 100 ms plus the value 770 of 15 ms) from the moment in time when the I/O operation 820 has been received for scheduling.

The purpose of adjusting the virtual time of the DG algorithms by the SAA 460 is to generate adjusted estimated processing deadlines for further (subsequent) I/O operations while taking into account a potential error associated with estimated costs Cs* by the drive model 470 for previous I/O operations. Indeed, by adding an amount of time corresponding to the amount of time by which the virtual time has been adjusted to the estimated time period P* for determining the adjusted estimated processing deadline of a respective I/O operation, the misalignment caused by the drive model 470 while estimating costs Cs* of I/O operations can be corrected or at least reduced.

As mentioned above, virtual time is used for representing processing time intervals (or the sum thereof) that are planned for the memory drive 402. However, by using estimated costs Cs* that are inferior to the actual costs Cs of I/O operations, processing time intervals that are planned for the memory drive 402 are "erroneously" planned by an amount of time equal to the difference between the estimated costs Cs* and the actual costs Cs of I/O operations. In other words, the processing time for I/O operations may have been underestimated by the drive model 470. Therefore, adjusting the estimated processing deadline by 15 ms in the example illustrated in FIG. 8 allows correcting or at least reducing this erroneous planning for I/O operations being scheduled following the adjustment of the virtual time.

It should be noted that the SAA 460 may be configured to selectively and periodically adjust the virtual time. For example, the SAA 460 may be configured to compare a sum of actual costs Cs of I/O operations and a sum of estimated costs Cs* of I/O operations in each I/O batch processed by the memory drive 402 and may accordingly selectively adjust the virtual time every time that the sum of estimated costs Cs* of I/O operations is inferior to the sum of actual costs Cs of I/O operations. This adjustment of the virtual time may be performed periodically for each processed I/O batch when needed. Alternatively, this adjustment of the virtual time may be performed periodically for each processed I/O operation when needed.

Therefore, even though the drive model 470 may underestimate some costs Cs of some I/O operations, periodically adjusting the virtual time as described above, may allow periodically correcting or at least reducing the erroneous planning of the processing time intervals of the memory drive 402 by the operations scheduler 408.

It is contemplated that adjusting the virtual time, as explained above, may result in adjusted estimated processing deadlines for I/O operations that are further in time than if the virtual time has not been adjusted (e.g., further in time than the respective estimated processing deadlines). This may help in processing future I/O operations before their respective so-generated adjusted estimated processing deadlines.

Figure 9:
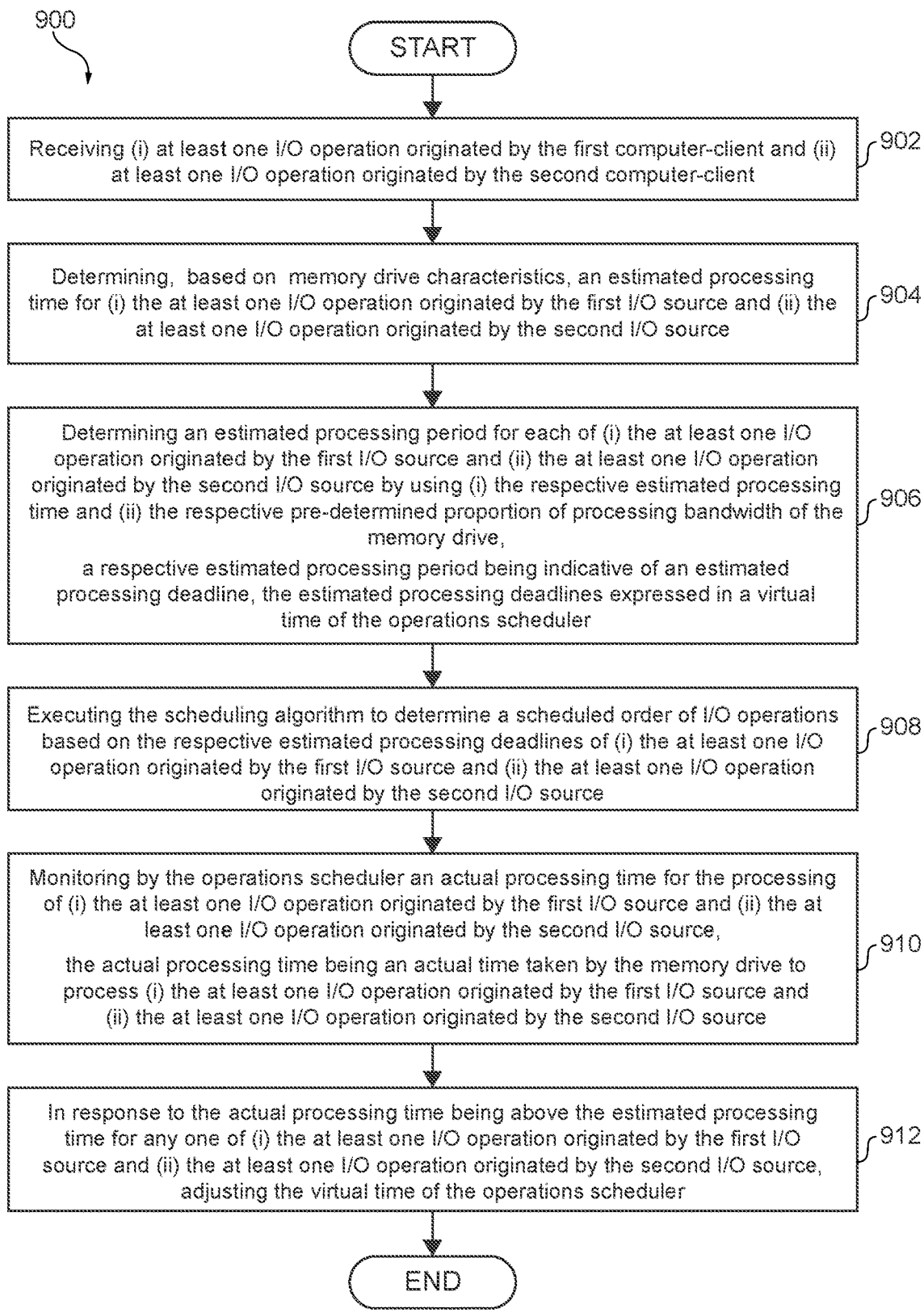
FIG. 9 depicts a block diagram of a method, the method being executable within the multi-source system of FIG. 4 and being implemented in accordance with non-limiting embodiments of the present technology.

In some embodiments of the present technology, the operations scheduler 408 is configured to execute a method 900, depicted in FIG. 9, for scheduling I/O operations to be processed by the memory drive 402. The method 900 will now be described.

STEP 902: Receiving (i) at Least One I/O Operation Originated by the First I/O Source and (ii) at Least One I/O Operation Originated by the Second I/O Source The method 900 begins at step 902 with the operations scheduler 408 configured to receive at least one I/O operation originated by the first I/O source 404 (see FIG. 5), such as the I/O operation 520, for example, and at least one I/O operation originated by the second I/O source 406.

It should be noted that the first I/O source 404 is associated with the respective pre-determined proportion U1 of processing bandwidth of the memory drive 402 for processing the at least one I/O operation originated by the first I/O source 404 (such as the I/O operation 520). Similarly, the second I/O source 406 is associated with the respective pre-determined proportion of processing bandwidth of the memory drive 402 for processing the at least one I/O operation originated by the second I/O source 406, as explained above.

STEP 904: Determining, Based on Memory Drive Characteristics, an Estimated Processing Time for (i) the at Least One I/O Operation Originated by the First I/O Source and (ii) the at Least One I/O Operation Originated by the Second I/O Source The method 900 continues to step 904 with the operations scheduler 408 configured to determine an estimated processing time (estimated cost C*) for each of the at least one I/O operation originated by the first I/O source 404 and the at least one I/O operation originated by the second I/O source 406, based on the memory drive characteristics of the memory drive 402.

It is contemplated that the operations scheduler 408 may perform the step 904 by using the drive model 470. As explained above, the drive model 470 is a given prediction model emulating operation of the memory drive 402 based on the memory drive characteristics of the memory drive 402.

In the case of the I/O operation 520 depicted in FIG. 5, the operations scheduler 408 may employ the drive model 470 (built based on the memory drive characteristics of the memory drive 402) to determine the estimated processing time (estimated cost C1*) based on the I/O operation 520.

STEP 906: Determining an Estimated Processing Period for Each of (i) the at Least One I/O Operation Originated by the First I/O Source and (ii) the at Least One I/O Operation Originated by the Second I/O Source by Using (i) the Respective Estimated Processing Time and (ii) the Respective Pre-Determined Proportion of Processing Bandwidth of the Memory Drive, a Respective Estimated Processing Period being Indicative of an Estimated Processing Deadline, the Estimated Processing Deadlines Expressed in a Virtual Time of the Operations Scheduler The method 900 continues to step 906 with the operations scheduler 408 configured to determine an estimated processing period (P*) for each of the at least one I/O operation originated by the first I/O source 404 and the at least one I/O operation originated by the second I/O source 406.

For example, the step 906 may be performed by the operations scheduler 408 by employing DG algorithms as explained above.

The operations scheduler 408 is configured to determine the respective estimated processing period P* based on the respective estimated processing time (respective estimated cost C*) and the respective pre-determined proportion of processing bandwidth of the memory drive 402 (respective U).

It is contemplated that the operations scheduler 408 may be configured to determine the respective estimated processing period P* by determining a ratio between the respective estimated processing time (respective estimated cost C*) and the respective pre-determined proportion of processing bandwidth of the memory drive 402 (respective U).

In the case of the I/O operation 520 depicted in FIG. 5, the operations scheduler 408 may determine the estimated processing period P1* as a ratio between the estimated cost C1* and the respective pre-determined proportion of processing bandwidth U1 of the memory drive 402.

It is contemplated that the I/O operation 520 may be a non-suspendable I/O operation which means that the I/O operation 520 needs to be processed as a whole by the memory drive 402 without "splitting" the processing of the I/O operation 520.

Therefore, as explained above and as illustrated in FIG. 5, such a determination of the estimated processing period P1* is done such that the I/O operation 520 is non-suspendably processable by the memory drive 402 within the estimated processing period P1* while respective the pre-determined proportion U1 of processing bandwidth of the memory drive 402 allocated to the first I/O source 404 having originated the I/O operation 520.

STEP 908: Executing the Scheduling Algorithm to Determine a Scheduled Order of I/O Operations Based on the Respective Estimated Processing Deadlines of (i) the at Least One I/O Operation Originated by the First I/O Source and (ii) the at Least One I/O Operation Originated by the Second I/O Source The method 900 continues to step 908 with the operations scheduler 408 configured to execute a scheduling algorithm to determine a scheduler order of I/O operations based on the respective estimated processing deadlines of (i) the at least one I/O operation originated by the first I/O source 404 and (ii) the at least one I/O operation originated by the second I/O source 406.

The operations scheduler 408 may perform the step 908 by executing the real-time type scheduling algorithm 458. In some embodiments, it is contemplated that the real-time type scheduling algorithm 458 may be an EDF-type scheduling algorithm.

For example, (i) the at least one I/O operation originated by the first I/O source 404 and (ii) the at least one I/O operation originated by the second I/O source 406 may be transmitted to the real-time type scheduling algorithm 458 in association with the respective estimated processing deadlines.

As a result, the real-time type scheduling algorithm 458 may determine the scheduled order of I/O operations (a scheduled order of (i) the at least one I/O operation originated by the first I/O source 404 and (ii) the at least one I/O operation originated by the second I/O source 406) based on the respective estimated processing deadlines.

In some embodiments, the I/O operations ordered by the real-time type scheduling algorithm 458 may be transmitted by the operations scheduler 408 to the memory drive 402 in batches. For example, in some embodiments of the present technology, the operations scheduler 408 may be configured to group the ordered I/O operations into I/O batches and transmit these I/O batches to the memory drive 402 for processing.

In other embodiments, where the memory drive 402 is implemented as the memory drive 126, the grouping of the I/O operations into I/O batches may be performed by a given intermediary component such as the real-time operation enforcing application 122, for example. For instance, the operations scheduler 408 may be configured to transmit the ordered I/O operations to the real-time operation enforcing application 122 which then groups them into I/O batches and transmits the I/O batches to the memory drive 402 for processing.

STEP 910: Monitoring by the Operations Scheduler an Actual Processing Time for the Processing of (i) the at Least One I/O Operation Originated by the First I/O Source and (ii) the at Least One I/O Operation Originated by the Second I/O Source, the Actual Processing Time being a Actual Time Taken by the Memory Drive to Process (i) the at Least One I/O Operation Originated by the First I/O Source and (ii) the at Least One I/O Operation Originated by the Second I/O Source The method 900 continues to step 910 with the operations scheduler 408 configured to monitor an actual processing time (actual cost C) for processing of (i) the at least one I/O operation originated by the first I/O source 404 and (ii) the at least one I/O operation originated by the second I/O source 406.

For example, the step 910 may be performed by the operations scheduler 408 by employing the SAA 460.

The operations scheduler 408 may monitor the actual time taken by the memory drive 402 to process (i) the at least one I/O operation originated by the first I/O source 404 and (ii) the at least one I/O operation originated by the second I/O source 406.

For example, as depicted in FIG. 6, the operations scheduler 408 may monitor the actual costs Cs of the I/O operations 604, 606, 608 and 610. In some embodiments, the operations scheduler 408 may monitor the actual costs Cs of the I/O operations 604, 606, 608 and 610 individually. In other embodiments, the operations scheduler 408 may monitor the actual costs Cs of the I/O operations 604, 606, 608 and 610 as group by monitoring the actual time taken by the memory drive 402 to process the I/O batch 602.

It should be noted that the actual processing time (actual cost C) of a given I/O operation may be different from the estimated processing time (estimated cost C*) of a given I/O operation. This may occur when the drive model 470 overestimates or underestimates the actual cost C for the given I/O operation.

In some embodiments of the present technology, it is contemplated that in order to monitor the actual processing time (actual cost C) for processing of (i) the at least one I/O operation originated by the first I/O source 404 and (ii) the at least one I/O operation originated by the second I/O source 406, the operations scheduler 408 may be configured to receive, from the memory drive 402, processing confirmations indicative of the actual processing time for (i) the at least one I/O operation originated by the first I/O source 404 and (ii) the at least one I/O operation originated by the second I/O source 406.

STEP 912: In Response to the Actual Processing Time being Above the Estimated Processing Time for any One of (i) the at Least One I/O Operation Originated by the First I/O Source and (ii) the at Least One I/O Operation Originated by the Second I/O Source, Adjusting the Virtual Time of the Operations Scheduler The method 900 continues to step 912 with the operations scheduler 408 being configured to adjust the virtual time of the operations scheduler 408 in response to the actual processing time (actual cost C) being above the estimated processing time (estimated cost C*) for any one of (i) the at least one I/O operation originated by the first I/O source 404 and (ii) the at least one I/O operation originated by the second I/O source 406.

For example, let it be assumed that a given I/O operation (a given one amongst the at least one I/O operation originated by the first I/O source 404 and the at least one I/O operation originated by the second I/O source 406) has an actual processing time that is above its respective estimated processing time. In other words, let it be assumed that the actual cost C for the given I/O operation is above the estimated cost C* that has been determined for the given I/O operation by the drive model 470 during the scheduling of the given I/O operation.

This means that the memory drive 402 took longer to process the given I/O operation than it has been estimated by the drive model 470. In other words, the drive model 470 underestimated the amount of processing time that the memory drive 402 actually took to process the given I/O operation.

It is contemplated that, the virtual time, which is used for representing processing time intervals (or the sum thereof) that are planned for the memory drive 402, is adjusted so that further processing time intervals for processing further I/O operations can be planned while taking into account that a previously planned processing time interval (for processing of the given I/O operation) was longer than previously estimated.

Let it be assumed that the operations scheduler 408 receives an other I/O operation following the determination of that the actual processing time C is above the estimated processing time C* for the given I/O operation.

As such, it is contemplated that, adjusting the virtual time, in some embodiments of the present technology, may comprise the operations scheduler 408 being configured, when determining an estimated processing period P* for the other I/O operation, to add (i) an amount of time that is equal to the difference between the actual processing time C and the estimated processing time C* for the given I/O operation to (ii) the estimated processing period P* for the other I/O operation. The operations scheduler 408 may thereby be configured to determine an adjusted estimated processing period for the other I/O operation. Consequently, the adjusted estimated processing period for the other I/O operation may be indicative of an adjusted estimated processing deadline for the other I/O operation.

In the non-limiting example of the I/O operation 820 illustrated in FIG. 8, the I/O operation 820 is received by the operations scheduler 408 following the determination of that the virtual time is to be adjusted by the value 770 of 15 ms.

As such, during the determination of the estimated processing period P2* for the I/O operation 820, the operations scheduler 408 is configured to add the value 770 of 15 ms to the estimated processing period P2* of 100 ms, thereby determining the adjusted estimated processing period of 115 ms for the I/O operation 820.

It should be noted that using during scheduling the adjusted estimated processing period, instead of the estimated processing period P2* for the I/O operation 820, results in different estimated processing deadlines.

On the one hand, using the estimated processing period P2* for the I/O operation 820 would result in the estimated processing deadline of 100 ms from the moment in time when the I/O operation 820 has been received by the operations scheduler 408. On the other hand, using the adjusted estimated processing period for the I/O operation 820 results in the adjusted estimated processing deadline of 115 ms from the moment in time when the I/O operation 820 has been received by the operations scheduler 408.

Hence, this increase of estimated processing deadline for the I/O operation 820 in response to the adjustment of the virtual time by the operations scheduler 408, allows taking into account an underestimation of the processing time performed for a previous I/O operation that caused an underestimation of the respective processing period for the previous I/O operation.

It should be noted that, estimated processing deadlines of additional I/O operations, which are received by the operations scheduler 408 following the determination of that the virtual time is to be adjusted by the value 770 of 15 ms, may be adjusted similarly to how the estimated processing deadline for the I/O operation 820 is adjusted. Hence, it can be said that by adjusting the virtual time, the operations scheduler 408 may be configured to adjust the estimated processing deadlines of all I/O operations received following the adjustment of the virtual time.

It is contemplated that, in other embodiments of the present technology, the operations scheduler 408 may also be configured to adjust the virtual time in response to the actual processing time being below the estimated processing time of the given I/O operation (in response to overestimation of processing time). In this case, instead of adding an amount of time equal to the difference between the actual processing time being below the estimated processing time of the given I/O operation to estimated processing periods of future I/O operations, the operations scheduler 408 may be configured to subtract this amount of time.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of scheduling a plurality of input/output (I/O) operations to be processed by a memory drive, the memory drive being part of a distributed computer system having:
    a plurality of I/O sources, the plurality of I/O sources having a first I/O source and a second I/O source, the plurality of I/O sources originating the plurality of I/O operations;
        each of the first I/O source and the second I/O source being associated with a respective pre-determined proportion of processing bandwidth of the memory drive for processing I/O operations from each one of the first I/O source and the second I/O source;
    an operations scheduler implementing a scheduling algorithm for scheduling the plurality of I/O operations for transmission to the memory drive,
    the method executable by the operations scheduler, the method comprising:
    receiving (i) at least one I/O operation originated by the first I/O source and (ii) at least one I/O operation originated by the second I/O source;
    determining, based on memory drive characteristics, an estimated processing time for (i) the at least one I/O operation originated by the first I/O source and (ii) the at least one I/O operation originated by the second I/O source;
    determining an estimated processing period for each of (i) the at least one I/O operation originated by the first I/O source and (ii) the at least one I/O operation originated by the second I/O source by using (i) the respective estimated processing time and (ii) the respective pre-determined proportion of processing bandwidth of the memory drive,
        a respective estimated processing period being indicative of an estimated processing deadline, the estimated processing deadlines expressed in a virtual time of the operations scheduler;
    executing the scheduling algorithm to determine a scheduled order of I/O operations based on the respective estimated processing deadlines of (i) the at least one I/O operation originated by the first I/O source and (ii) the at least one I/O operation originated by the second I/O source;
    monitoring by the operations scheduler an actual processing time for the processing of (i) the at least one I/O operation originated by the first I/O source and (ii) the at least one I/O operation originated by the second I/O source,
        the actual processing time being an actual time taken by the memory drive to process (i) the at least one I/O operation originated by the first I/O source and (ii) the at least one I/O operation originated by the second I/O source;
    in response to the actual processing time being above the estimated processing time for any one of (i) the at least one I/O operation originated by the first I/O source and (ii) the at least one I/O operation originated by the second I/O source, adjusting the virtual time of the operations scheduler.

2. The method of claim 1, wherein the adjusting the virtual time comprises:
    when determining an estimated processing period for an other I/O operation, adding an amount of time to the estimated processing period for the other I/O operation thereby determining an adjusted estimated processing period for the other I/O operation,
        the amount of time being a difference between the actual processing time and the estimated processing time for (i) the at least one I/O operation originated by the first I/O source and (ii) the at least one I/O operation originated by the second I/O source.

3. The method of claim 2, wherein the adjusted estimated processing period for the other I/O operation is indicative of an adjusted estimated processing deadline for the other I/O operation.

4. The method of claim 1, wherein the monitoring by the operations scheduler the actual processing time for (i) the at least one I/O operation originated by the first I/O source and (ii) the at least one I/O operation originated by the second I/O source comprises receiving, from the memory drive, processing confirmations indicative of the actual processing time for (i) the at least one I/O operation originated by the first I/O source and (ii) the at least one I/O operation originated by the second I/O source.

5. The method of claim 1, wherein the scheduling algorithm is a real-time type scheduling algorithm.

6. The method of claim 5, wherein the real-time type scheduling algorithm is an Earliest Deadline First-type (EDF-type) scheduling algorithm.

7. The method of claim 1, wherein the determining the estimated processing period for each of (i) the at least one I/O operation originated by the first I/O source and (ii) the at least one I/O operation originated by the second I/O source comprises determining a ratio between the respective estimated processing time and the respective pre-determined proportion of processing bandwidth of the memory drive.

8. The method of claim 7, wherein the estimated processing period for a given one of (i) the at least one I/O operation originated by the first I/O source and (ii) the at least one I/O operation originated by the second I/O source is determined such that the given one of (i) the at least one I/O operation originated by the first I/O source and (ii) the at least one I/O operation originated by the second I/O source is non-suspendably processable within the estimated processing period while respecting the respective pre-determined proportion of processing bandwidth of the memory drive.

9. The method of claim 8, wherein the given I/O operation is a non-suspendable I/O operation.

10. The method of claim 1, wherein the determining the estimated processing time for each one of (i) the at least one I/O operation originated by the first I/O source and (ii) the at least one I/O operation originated by the second I/O source is performed by a prediction model emulating operation of the memory drive based on the memory drive characteristics.

11. An operations scheduler for scheduling a plurality of input/output (I/O) operations to be processed by a memory drive, the memory drive being part of a distributed computer system having:
- a plurality of I/O sources, the plurality of I/O sources having a first I/O source and a second I/O source, the plurality of I/O sources originating the plurality of I/O operations;
  - each of the first I/O source and the second I/O source being associated with a respective pre-determined proportion of processing bandwidth of the memory drive for processing I/O operations from each one of the first I/O source and the second I/O source;
- the operations scheduler implementing a scheduling algorithm for scheduling the plurality of I/O operations for transmission to the memory drive, the operations scheduler being configured to:
- receive (i) at least one I/O operation originated by the first I/O source and (ii) at least one I/O operation originated by the second I/O source;
- determine, based on memory drive characteristics, an estimated processing time for (i) the at least one I/O operation originated by the first I/O source and (ii) the at least one I/O operation originated by the second I/O source;
- determine an estimated processing period for each of (i) the at least one I/O operation originated by the first I/O source and (ii) the at least one I/O operation originated by the second I/O source by using (i) the respective estimated processing time and (ii) the respective pre-determined proportion of processing bandwidth of the memory drive,
  - a respective estimated processing period being indicative of an estimated processing deadline, the estimated processing deadlines expressed in a virtual time of the operations scheduler;
- execute the scheduling algorithm to determine a scheduled order of I/O operations based on the respective estimated processing deadlines of (i) the at least one I/O operation originated by the first I/O source and (ii) the at least one I/O operation originated by the second I/O source;
- monitor by the operations scheduler an actual processing time for the processing of (i) the at least one I/O operation originated by the first I/O source and (ii) the at least one I/O operation originated by the second I/O source,
  - the actual processing time being an actual time taken by the memory drive to process (i) the at least one I/O operation originated by the first I/O source and (ii) the at least one I/O operation originated by the second I/O source;
- in response to the actual processing time being above the estimated processing time for any one of (i) the at least one I/O operation originated by the first I/O source and (ii) the at least one I/O operation originated by the second I/O source, adjust the virtual time of the operations scheduler.

12. The operations scheduler of claim 11, wherein the operations scheduler configured to adjust the virtual time comprises the operations scheduler being configured to:
- when determining an estimated processing period for an other I/O operation, add an amount of time to the estimated processing period for the other I/O operation thereby determining an adjusted estimated processing period for the other I/O operation,
  - the amount of time being a difference between the actual processing time and the estimated processing time for (i) the at least one I/O operation originated by the first I/O source and (ii) the at least one I/O operation originated by the second I/O source.

13. The operations scheduler of claim 12, wherein the adjusted estimated processing period for the other I/O operation is indicative of an adjusted estimated processing deadline for the other I/O operation.

14. The operations scheduler of claim 11, wherein the operations scheduler configured to monitor the actual processing time for (i) the at least one I/O operation originated by the first I/O source and (ii) the at least one I/O operation originated by the second I/O source comprises the operations scheduler being configured to receive, from the memory drive, processing confirmations indicative of the actual processing time for (i) the at least one I/O operation originated by the first I/O source and (ii) the at least one I/O operation originated by the second I/O source.

15. The operations scheduler of claim 11, wherein the scheduling algorithm is a real-time type scheduling algorithm.

16. The operations scheduler of claim 15, wherein the real-time type scheduling algorithm is an Earliest Deadline First-type (EDF-type) scheduling algorithm.

17. The operations scheduler of claim 11, wherein the operations scheduler configured to determine the estimated processing period for each of (i) the at least one I/O operation originated by the first I/O source and (ii) the at least one I/O operation originated by the second I/O source comprises the operations scheduler being configured to determine a ratio between the respective estimated processing time and the respective pre-determined proportion of processing bandwidth of the memory drive.

18. The operations scheduler of claim 17, wherein the estimated processing period for a given one of (i) the at least one I/O operation originated by the first I/O source and (ii) the at least one I/O operation originated by the second I/O source is determined such that the given one of (i) the at least one I/O operation originated by the first I/O source and (ii) the at least one I/O operation originated by the second I/O source is non-suspendably processable within the estimated processing period while respecting the respective pre-determined proportion of processing bandwidth of the memory drive.

19. The operations scheduler of claim 18, wherein the given I/O operation is a non-suspendable I/O operation.

20. The operations scheduler of claim 11, wherein the operations scheduler is configured to determine the estimated processing time for each one of (i) the at least one I/O operation originated by the first I/O source and (ii) the at least one I/O operation originated by the second I/O source by using a prediction model emulating operation of the memory drive based on the memory drive characteristics.

* * * * *